United States Patent
Swinson et al.

(10) Patent No.: US 10,296,929 B2
(45) Date of Patent: May 21, 2019

(54) SYSTEM, METHOD AND COMPUTER PROGRAM PRODUCT FOR GEO-SPECIFIC VEHICLE PRICING

(75) Inventors: Michael Swinson, Santa Monica, CA (US); Param Pash Kaur Dhillon, Sherman Oaks, CA (US); Thomas J. Sullivan, Santa Monica, CA (US); Xingchu Liu, Los Angeles, CA (US)

(73) Assignee: TRUECAR, INC., Santa Monica, CA (US)

( * ) Notice: Subject to any disclaimer, the term of this patent is extended or adjusted under 35 U.S.C. 154(b) by 0 days.

(21) Appl. No.: 13/173,357

(22) Filed: Jun. 30, 2011

(65) Prior Publication Data

US 2013/0006876 A1    Jan. 3, 2013

(51) Int. Cl.
*G06Q 30/02*    (2012.01)

(52) U.S. Cl.
CPC ......... *G06Q 30/0206* (2013.01); *G06Q 30/02* (2013.01); *G06Q 30/0205* (2013.01)

(58) Field of Classification Search
CPC .................. G06Q 30/0283; G06Q 30/0206
USPC .. 705/306, 1.1, 80, 300–318, 329, 342–348, 705/500
See application file for complete search history.

(56) References Cited

U.S. PATENT DOCUMENTS

| | | | |
|---|---|---|---|
| 5,361,201 A * | 11/1994 | Jost | G06Q 40/02 705/35 |
| 5,377,095 A | 12/1994 | Maeda et al. | |
| 5,774,873 A | 6/1998 | Berent et al. | |
| 6,006,201 A | 12/1999 | Berent et al. | |
| 6,029,141 A | 2/2000 | Bezos et al. | |
| 6,125,356 A | 9/2000 | Brockman et al. | |
| 6,282,517 B1 | 8/2001 | Wolfe et al. | |
| 6,298,328 B1 | 10/2001 | Healy et al. | |
| 6,330,499 B1 | 12/2001 | Chou et al. | |
| 6,604,083 B1 | 8/2003 | Bailey | |
| 6,609,108 B1 | 8/2003 | Pulliam et al. | |

(Continued)

FOREIGN PATENT DOCUMENTS

| | | |
|---|---|---|
| CN | 1501301 A | 6/2004 |
| CN | 1734492 A | 2/2006 |

(Continued)

OTHER PUBLICATIONS

International Search Report and Written Opinion for PCT Application No. PCT/US2009/056316, dated Oct. 26, 2009, 7 pages.

(Continued)

*Primary Examiner* — Aryan E Weisenfeld
(74) *Attorney, Agent, or Firm* — Sprinkle IP Law Group

(57) ABSTRACT

Disclosed are embodiments for the aggregation and analysis of vehicle prices via a geo-specific model. Data may be collected at various geo-specific levels such as a ZIP-Code level to provide greater data resolution. Data sets taken into account may include demarcation point data sets and data sets based on vehicle transactions. A demarcation point data set may be based on consumer market factors that influence car-buying behavior. Vehicle transactions may be classified into data sets for other vehicles having similar characteristics to the vehicle. A geo-specific statistical pricing model may then be applied to the data sets based on similar characteristics to a particular vehicle to produce a price estimation for the vehicle.

18 Claims, 6 Drawing Sheets

(56) References Cited

U.S. PATENT DOCUMENTS

| | | |
|---|---|---|
| 6,882,983 B2 | 4/2005 | Furphy et al. |
| 6,892,185 B1 | 5/2005 | Van Etten et al. |
| 6,975,999 B2 | 12/2005 | Moore |
| 7,050,982 B2 | 5/2006 | Sheinson |
| 7,113,090 B1 | 9/2006 | Saylor |
| 7,133,835 B1 | 11/2006 | Fusz et al. |
| 7,184,974 B2 | 2/2007 | Shishido |
| 7,219,080 B1 | 5/2007 | Wagoner et al. |
| 7,287,000 B2 | 10/2007 | Boyd et al. |
| 7,366,679 B2 | 4/2008 | Yuyama et al. |
| 7,392,224 B1 | 6/2008 | Bauer et al. |
| 7,546,243 B2 | 6/2009 | Kapadia et al. |
| 7,596,501 B2 | 9/2009 | Tivey et al. |
| 7,596,512 B1 | 9/2009 | Raines et al. |
| 7,599,842 B2 | 10/2009 | Tivey et al. |
| 7,624,065 B2 | 11/2009 | Schoen et al. |
| 7,747,474 B2 | 6/2010 | Miloslavsky et al. |
| 7,778,841 B1 | 8/2010 | Bayer et al. |
| 7,801,798 B1 | 9/2010 | Huemer et al. |
| 7,818,201 B2 | 10/2010 | Shevlin et al. |
| 7,835,982 B2 | 11/2010 | Schoen et al. |
| 7,921,052 B2 | 4/2011 | Dabney et al. |
| 7,945,483 B2 | 5/2011 | Inghelbrecht et al. |
| 7,970,713 B1 | 6/2011 | Gorelik et al. |
| 8,000,989 B1 | 8/2011 | Kiefhaber et al. |
| 8,036,952 B2 | 10/2011 | Mohr et al. |
| 8,078,515 B2 | 12/2011 | John |
| 8,095,422 B2 | 1/2012 | Hallowell et al. |
| 8,108,262 B1 | 1/2012 | Thirumalai et al. |
| 8,112,325 B2 | 2/2012 | Foy et al. |
| 8,126,881 B1 | 2/2012 | Sethi et al. |
| 8,219,464 B2 | 7/2012 | Inghelbrecht et al. |
| 8,230,362 B2 | 7/2012 | Couch |
| 8,255,270 B2 | 8/2012 | Rose et al. |
| 8,326,845 B2 | 12/2012 | Sethi et al. |
| 8,375,037 B2 | 2/2013 | Sethi et al. |
| 8,392,264 B2 | 3/2013 | Doll |
| 8,429,220 B2 | 4/2013 | Wilkinson et al. |
| 8,515,817 B2 | 8/2013 | Noy et al. |
| 8,521,615 B2 | 8/2013 | Inghelbrecht et al. |
| 8,521,619 B2 | 8/2013 | Perry, III et al. |
| 8,538,828 B2 | 9/2013 | Skutta |
| 8,589,212 B2 | 11/2013 | Pollak et al. |
| 8,595,082 B2 | 11/2013 | Skutta |
| 8,612,314 B2 | 12/2013 | Swinson |
| 8,645,193 B2 | 2/2014 | Swinson et al. |
| 8,676,799 B1 | 3/2014 | Vaver |
| 8,818,881 B2 | 8/2014 | Himmerick et al. |
| 8,868,572 B2 | 10/2014 | Sethi et al. |
| 9,020,843 B2 | 4/2015 | Taira et al. |
| 9,020,844 B2 | 4/2015 | Taira et al. |
| 9,103,743 B2 | 8/2015 | Couch |
| 9,104,718 B1 | 8/2015 | Levy et al. |
| 9,111,308 B2 | 8/2015 | Taira et al. |
| 9,129,325 B2 | 9/2015 | Taira et al. |
| 9,189,960 B2 | 11/2015 | Couch et al. |
| 9,324,104 B1 | 4/2016 | Levy et al. |
| 9,347,758 B2 | 5/2016 | Berent et al. |
| D765,089 S | 8/2016 | Agee |
| 9,412,203 B1 | 8/2016 | Garcia, III et al. |
| 9,465,873 B1 | 10/2016 | Franke et al. |
| 9,466,079 B2 | 10/2016 | Hygema et al. |
| D774,523 S | 12/2016 | Agee |
| D774,524 S | 12/2016 | Agee |
| 9,600,822 B2 | 3/2017 | Pyle et al. |
| 9,727,904 B2 | 8/2017 | Inghelbrecht et al. |
| 9,754,304 B2 | 9/2017 | Taira et al. |
| 9,767,491 B2 | 9/2017 | Swinson et al. |
| 9,818,140 B2 | 11/2017 | Inghelbrecht et al. |
| 9,904,933 B2 | 2/2018 | Taira et al. |
| 9,904,948 B2 | 2/2018 | Taira et al. |
| 10,108,989 B2 | 10/2018 | Swinson et al. |
| 10,217,123 B2 | 2/2019 | Taira et al. |
| 2001/0037205 A1 | 11/2001 | Joao |
| 2001/0037265 A1 | 11/2001 | Kleinberg |
| 2002/0007331 A1 | 1/2002 | Lo et al. |
| 2002/0111856 A1 | 8/2002 | Messer et al. |
| 2002/0116348 A1* | 8/2002 | Phillips et al. ............... 705/400 |
| 2002/0147625 A1 | 10/2002 | Kolke, Jr. |
| 2002/0194051 A1 | 12/2002 | Hall et al. |
| 2003/0028437 A1 | 2/2003 | Grant et al. |
| 2003/0065532 A1 | 4/2003 | Takaoka |
| 2003/0083961 A1 | 5/2003 | Bezos et al. |
| 2003/0105728 A1 | 6/2003 | Yano et al. |
| 2003/0130966 A1 | 7/2003 | Thompson et al. |
| 2003/0200151 A1 | 10/2003 | Ellenson et al. |
| 2003/0220773 A1 | 11/2003 | Haas et al. |
| 2003/0229577 A1 | 12/2003 | Nabel |
| 2004/0014454 A1 | 1/2004 | Burgess |
| 2004/0019516 A1 | 1/2004 | Puskorius et al. |
| 2004/0093284 A1 | 5/2004 | Takaoka |
| 2004/0128224 A1 | 7/2004 | Dabney et al. |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0172266 A1 | 9/2004 | Sheinson et al. |
| 2004/0210485 A1 | 10/2004 | Luo et al. |
| 2004/0254808 A1 | 12/2004 | Bennett et al. |
| 2005/0071249 A1 | 3/2005 | Nix et al. |
| 2005/0086070 A1 | 4/2005 | Engelman |
| 2005/0108112 A1 | 5/2005 | Ellenson et al. |
| 2005/0125308 A1 | 6/2005 | Puentes et al. |
| 2005/0144061 A1 | 6/2005 | Rarity et al. |
| 2005/0171859 A1 | 8/2005 | Harrington et al. |
| 2005/0171896 A1 | 8/2005 | Seretti et al. |
| 2005/0197941 A1 | 9/2005 | Veit |
| 2005/0209934 A1 | 9/2005 | Irby et al. |
| 2005/0256778 A1 | 11/2005 | Boyd et al. |
| 2005/0256780 A1 | 11/2005 | Eldred |
| 2005/0261951 A1 | 11/2005 | Tighe |
| 2005/0266833 A1 | 12/2005 | Walker |
| 2005/0267774 A1 | 12/2005 | Merritt et al. |
| 2006/0080210 A1 | 4/2006 | Mourad et al. |
| 2006/0085209 A1 | 4/2006 | Walker, III |
| 2006/0085283 A1 | 4/2006 | Griffiths |
| 2006/0106668 A1 | 5/2006 | Kim et al. |
| 2006/0129423 A1 | 6/2006 | Sheinson et al. |
| 2006/0178973 A1 | 8/2006 | Chiovari et al. |
| 2006/0212355 A1 | 9/2006 | Teague et al. |
| 2006/0242089 A1 | 10/2006 | Vahidi et al. |
| 2007/0005446 A1 | 1/2007 | Fusz et al. |
| 2007/0038522 A1 | 2/2007 | Bell et al. |
| 2007/0112582 A1 | 5/2007 | Fenlon |
| 2007/0124284 A1 | 5/2007 | Lin et al. |
| 2007/0143132 A1* | 6/2007 | Linne et al. .................. 705/1 |
| 2007/0143195 A1 | 6/2007 | Bell et al. |
| 2007/0162293 A1 | 7/2007 | Malkon |
| 2007/0185777 A1 | 8/2007 | Pyle et al. |
| 2007/0219851 A1 | 9/2007 | Taddei et al. |
| 2007/0244797 A1 | 10/2007 | Hinson et al. |
| 2007/0250327 A1 | 10/2007 | Hedy |
| 2008/0027882 A1 | 1/2008 | Allen et al. |
| 2008/0046383 A1 | 2/2008 | Hirtenstein et al. |
| 2008/0052216 A1 | 2/2008 | Johnson et al. |
| 2008/0077477 A1 | 3/2008 | McElhiney et al. |
| 2008/0177590 A1 | 7/2008 | Brodsky et al. |
| 2008/0189156 A1 | 8/2008 | Voda et al. |
| 2008/0201163 A1 | 8/2008 | Barker et al. |
| 2008/0201203 A1 | 8/2008 | Rose et al. |
| 2008/0207191 A1 | 8/2008 | Fleenor et al. |
| 2008/0288312 A1* | 11/2008 | Miles et al. ................ 705/7 |
| 2008/0288361 A1 | 11/2008 | Rego et al. |
| 2008/0300962 A1 | 12/2008 | Cawston et al. |
| 2009/0006118 A1 | 1/2009 | Pollak |
| 2009/0037356 A1 | 2/2009 | Rothstein et al. |
| 2009/0048859 A1 | 2/2009 | McCarthy et al. |
| 2009/0157522 A1* | 6/2009 | Srinivasan et al. ............. 705/26 |
| 2009/0171761 A1 | 7/2009 | Noy et al. |
| 2009/0187513 A1 | 7/2009 | Noy et al. |
| 2010/0070343 A1* | 3/2010 | Taira et al. .................. 705/10 |
| 2010/0070344 A1 | 3/2010 | Taira et al. |
| 2010/0070382 A1 | 3/2010 | Inghelbrecht et al. |
| 2010/0088158 A1 | 4/2010 | Pollak |
| 2010/0161376 A1 | 6/2010 | Spagnolo |

(56) References Cited

U.S. PATENT DOCUMENTS

| | | |
|---|---|---|
| 2010/0161408 A1 | 6/2010 | Karson et al. |
| 2010/0179861 A1* | 7/2010 | Teerilahti et al. .............. 705/10 |
| 2010/0191659 A1 | 7/2010 | Hebron |
| 2010/0198735 A1 | 8/2010 | Basak et al. |
| 2010/0274571 A1 | 10/2010 | McFall et al. |
| 2010/0274631 A1 | 10/2010 | McFall et al. |
| 2011/0022525 A1 | 1/2011 | Swinson et al. |
| 2011/0040697 A1 | 2/2011 | Constantinou et al. |
| 2011/0082720 A1 | 4/2011 | Swinson et al. |
| 2011/0082759 A1 | 4/2011 | Swinson et al. |
| 2011/0082804 A1 | 4/2011 | Swinson et al. |
| 2011/0131652 A1 | 6/2011 | Robinson et al. |
| 2011/0161197 A1 | 6/2011 | Noy et al. |
| 2011/0173227 A1 | 7/2011 | Klein |
| 2011/0202471 A1 | 8/2011 | Scott et al. |
| 2012/0005070 A1 | 1/2012 | Mcfall et al. |
| 2012/0005108 A1 | 1/2012 | Hollenshead et al. |
| 2012/0197699 A1 | 8/2012 | Snell et al. |
| 2012/0233014 A1 | 9/2012 | Banks et al. |
| 2012/0259728 A1 | 10/2012 | Inghelbrecht et al. |
| 2012/0284087 A1 | 11/2012 | Pollak |
| 2012/0284113 A1 | 11/2012 | Pollak |
| 2012/0316997 A1 | 12/2012 | Herbert |
| 2013/0018752 A1 | 1/2013 | Foster |
| 2013/0030870 A1 | 1/2013 | Swinson et al. |
| 2013/0103457 A1* | 4/2013 | Marshall et al. ............ 705/7.34 |
| 2013/0117067 A1 | 5/2013 | Sullivan et al. |
| 2013/0191247 A1 | 7/2013 | Huang et al. |
| 2013/0304571 A1 | 11/2013 | Swinson et al. |
| 2013/0311319 A1 | 11/2013 | Noy et al. |
| 2013/0311341 A1 | 11/2013 | Noy et al. |
| 2013/0339173 A1 | 12/2013 | Skutta |
| 2014/0032352 A1 | 1/2014 | Fraser et al. |
| 2014/0032353 A1 | 1/2014 | Fraser et al. |
| 2014/0058957 A1 | 2/2014 | Swinson et al. |
| 2014/0067615 A1 | 3/2014 | Park et al. |
| 2014/0074553 A1 | 3/2014 | Sullivan et al. |
| 2014/0089208 A1 | 3/2014 | Humble et al. |
| 2014/0114726 A1 | 4/2014 | Swinson et al. |
| 2014/0149183 A1 | 5/2014 | Liu et al. |
| 2014/0214491 A1 | 7/2014 | Semeniuk et al. |
| 2014/0214696 A1 | 7/2014 | Laughlin et al. |
| 2014/0229240 A1 | 8/2014 | Taira et al. |
| 2014/0229241 A1 | 8/2014 | Taira et al. |
| 2014/0229391 A1 | 8/2014 | East, III et al. |
| 2014/0237410 A1 | 8/2014 | Klein |
| 2014/0244424 A1 | 8/2014 | Swinson et al. |
| 2014/0257934 A1 | 9/2014 | Chrzan et al. |
| 2014/0258044 A1 | 9/2014 | Chrzan et al. |
| 2014/0278806 A1 | 9/2014 | Duguid et al. |
| 2014/0279020 A1 | 9/2014 | Duguid et al. |
| 2014/0279171 A1 | 9/2014 | Burgiss et al. |
| 2014/0279229 A1 | 9/2014 | Burgiss et al. |
| 2014/0279263 A1 | 9/2014 | Liu et al. |
| 2014/0279275 A1 | 9/2014 | Burgiss et al. |
| 2014/0279709 A1 | 9/2014 | Lander et al. |
| 2014/0351074 A1 | 11/2014 | Enge et al. |
| 2014/0358719 A1 | 12/2014 | Inghelbrecht et al. |
| 2015/0058152 A1 | 2/2015 | Pollak et al. |
| 2015/0134422 A1 | 5/2015 | Swinson et al. |
| 2015/0193800 A1 | 7/2015 | Taira et al. |
| 2015/0206162 A1 | 7/2015 | Taira et al. |
| 2015/0206206 A1 | 7/2015 | Puente et al. |
| 2015/0220876 A1 | 8/2015 | Sethi et al. |
| 2015/0242926 A1 | 8/2015 | Taira et al. |
| 2015/0310466 A1 | 10/2015 | LaCivita et al. |
| 2015/0324737 A1 | 11/2015 | Chrzan et al. |
| 2015/0324879 A1 | 11/2015 | Lu et al. |
| 2015/0356672 A1 | 12/2015 | Humble et al. |
| 2015/0363838 A1 | 12/2015 | Wu et al. |
| 2015/0363865 A1 | 12/2015 | Ramanuja et al. |
| 2016/0343058 A1 | 11/2016 | Levy et al. |
| 2016/0371323 A1 | 12/2016 | Garcia, III et al. |
| 2017/0109768 A1 | 4/2017 | Swinson et al. |
| 2017/0109769 A1 | 4/2017 | Inghelbrecht et al. |
| 2017/0109799 A1 | 4/2017 | Swinson et al. |
| 2017/0109833 A1 | 4/2017 | Taira et al. |
| 2017/0286983 A1 | 10/2017 | Taira et al. |
| 2017/0372381 A1 | 12/2017 | Swinson et al. |
| 2018/0158086 A1 | 6/2018 | Taira et al. |
| 2019/0034983 A1 | 1/2019 | Swinson et al. |

FOREIGN PATENT DOCUMENTS

| | | |
|---|---|---|
| CN | 1892691 | 1/2007 |
| CN | 101785023 A | 7/2010 |
| CN | 1386236 A | 12/2012 |
| EP | 1326176 | 7/2003 |
| JP | 2001-117973 | 4/2001 |
| JP | 2001-155106 | 6/2001 |
| JP | 2001-209674 | 8/2001 |
| JP | 2001-256356 | 9/2001 |
| JP | 2001-306851 | 11/2001 |
| JP | 2002-117275 | 4/2002 |
| JP | 2002-132827 | 5/2002 |
| JP | 2002-329097 | 11/2002 |
| JP | 2002-358478 | 12/2002 |
| JP | 2003-024387 | 1/2003 |
| JP | 2003-108811 | 4/2003 |
| JP | 2003-108847 | 4/2003 |
| JP | 2003-173406 | 6/2003 |
| JP | 2004-070534 | 3/2004 |
| JP | 2004-516554 | 6/2004 |
| JP | 2004-213065 | 7/2004 |
| JP | 2006-268635 | 10/2006 |
| JP | 2007-122197 | 5/2007 |
| JP | 2008-058039 | 3/2008 |
| JP | 2008-165764 | 7/2008 |
| WO | WO200140898 A2 | 6/2001 |
| WO | WO 2007002684 | 1/2007 |
| WO | WO2007002754 A2 | 1/2007 |
| WO | WO200140898 A3 | 11/2007 |
| WO | WO 2010030632 | 3/2010 |

OTHER PUBLICATIONS

International Search Report and Written Opinion for PCT Application No. PCT/US2009/056315, dated Oct. 20, 2009, 7 pages.
International Search Report and Written Opinion for PCT Application No. PCT/US2009/056317, dated Dec. 10, 2009, 8 pages.
Office Action issued for U.S. Appl. No. 12/556,137, dated Sep. 1, 2010, 14 pages.
cars.com, http://cars.com/ Internet Archive Jul. 18, 2007—http://web.archive.org/web/20070718071752/www.car.com/, printed Aug. 27, 2010, 2 pages.
Office Action issued for U.S. Appl. No. 12/556,137, dated Dec. 30, 2010, 15 pages.
edmunds.com http://www.edmunds.com/Internet Archive Jan. 18, 2010—http://web.archive.org/web/20080118210310/http://www.edmunds.com/ printed Dec. 15, 2010, 3 pages.
Notice of Allowance issued in U.S. Appl. No. 12/556,137, dated Feb. 10, 2011, 9 pages.
Office Action issued for U.S. Appl. No. 13/080,832, dated Oct. 12, 2011, 12 pages.
2nd Written Opinion issued for PCT Application No. PCT/US09/56317, dated Dec. 6, 2011, 6 pages.
Office Action issued for U.S. Appl. No. 12/556,076 dated Dec. 27, 2011, 13 pages.
Office Action issued for U.S. Appl. No. 12/556,109 dated Jan. 24, 2012, 16 pages.
Notice of Allowance issued for U.S. Appl. No. 13/080,832 dated Feb. 10, 2012, 11 pages.
"CarPrices.com, Selectica and JATO Dynamics Enter Agreement to Deliver Online Car Configuration Package", Business Wire, Dec. 13, 1999, 5 pages.
Office Action issued for U.S. Appl. No. 12/556,076, dated Mar. 26, 2012, 14 pages.
Office Action issued for U.S. Appl. No. 12/556,109, dated Mar. 26, 2012, 15 pages.

(56) References Cited

OTHER PUBLICATIONS

Goldberg, "Job Security through PPC-CRM Integration", paydigest.com, published Aug. 22, 2007.
Sauberlich, et al. "Analytical Lead Management in the Automotive Industry," Data Analysis and Decision Support, Springer Heidelberg Berlin 2005, pp. 290-299.
Office Action issued for U.S. Appl. No. 11/968,137, dated Dec. 23, 2010, 8 pages.
Office Action issued for U.S. Appl. No. 11/968,137, dated Jun. 9, 2011, 9 pages. '137 application.
Office Action issued for U.S. Appl. No. 11/968,137, dated Dec. 19, 2011, 10 pages.
Gregory M. Collins, "Technology Opens Up Huge CRM Opportunities for Retailers," Jun. 10, 2002. Retrieved from http://www.destinationcrm.com/Articles/PrintArticle.aspx?ArticleID=474 19, 3 pages.
Rick Gibbs, "How Google Base Replaces Autos Classifieds", Nov. 27, 2006. Retrieved from http://www.imediaconnection.com/printpage.aspx?id=12548, 4 pages.
No Author, "3 Reasons Why Using Google Pays Off for Automobile Dealers," 2005 Retrieved from http://www.kaistudios.com/PPC/guides/Google-autodealers.htm, 2 pages.
Office Action issued for U.S. Appl. No. 12/179,164, dated Sep. 30, 2009, 19 pages.
Office Action issued for U.S. Appl. No. 12/179,164, dated Apr. 8, 2010, 20 pages.
"Innovative Website Moves Consumer Auto Purchases Online: Capital One Offers Miami Buyers a One-Stop Resource for Car Purchase, Putting an End to Hassles and Fustration," Business Wire, Jul. 18, 2006, 3 pages.
Office Action issued for U.S. Appl. No. 12/179,164, dated Oct. 27, 2010, 20 pages.
Office Action issued for U.S. Appl. No. 12/179,164, dated Feb. 15, 2011, 20 pages.
Office Action issued for U.S. Appl. No. 12/179,164, dated Sep. 2, 2011, 21 pages.
International Preliminary Report on Patentability (IPRP) issued for PCT Patent Application No. PCT/US2009/056316, dated May 1, 2012, 6 pages.
Extended European Search Report issued for European Patent Application No. 09 813 513.0, dated Feb. 21, 2012, 8 pages.
Extended European Search Report issued for European Patent Application No. 09 813 514.8, dated Apr. 25, 2012, 5 pages.
International Preliminary Report on Patentability (IPRP) issued for PCT Patent Application No. PCT/US2009/056315, dated May 16, 2012, 6 pages.
Notice of Allowance issued for U.S. Appl. No. 11/968,137, dated May 9, 2012, 6 pages.
Office Action issued for U.S. Appl. No. 12/179,164, dated May 25, 2012, 21 pages.
Corrected Notice of Allowability for U.S. Appl. No. 13/080,832, dated Jun. 7, 2012, 4 pages.
Corrected Notice of Allowability for U.S. Appl. No. 13/080,832, dated Jun. 8, 2012, 4 pages.
Office Action issued for Chinese Patent Application No. 200980141911.3, dated May 30, 2012, 4 pages.
Office Action (with English translation) for Chinese Patent Application No. 200980142589.6, dated Sep. 5, 2012, 9 pages.
International Preliminary Report on Patentability for International Patent Application No. PCT/US2009/056317, dated Sep. 27, 2012, 8 pages.
Office Action issued for U.S. Appl. No. 12/179,164, dated Oct. 9, 2012, 20 pages.
"Zag Acquires Automotive Invitational Services, Auto-Buying Service for More than 6 Million AAA Members," Business Wire, Jun. 13, 2006, 3 pages.
Office Action issued for U.S. Appl. No. 13/524,116, dated Nov. 27, 2012, 13 pages.
Office Action issued for U.S. Appl. No. 12/179,164, dated Jan. 29, 2013, 19 pages.
Office Action issued for Chinese Patent Application No. 200980141911.3, dated Feb. 6, 2013, 9 pages.
Examination Report issued for European Patent Application No. 09 813 513.0, dated Mar. 20, 2013, 7 pages.
Notice of Allowance issued for U.S. Appl. No. 13/524,116, dated Apr. 25, 2013, 8 pages.
"Carfax and EDS Announce New On-Line Service," PR Newswire, Oct. 13, 1994, 2 pages.
Office Action issued for U.S. Appl. No. 12/179,164, dated May 8, 2013, 19 pages.
Office Action issued for Chinese Patent Application No. 200980142589.6, dated Apr. 15, 2013, 10 pages.
Notice of Allowance issued for U.S. Appl. No. 11/968,137, dated Jun. 12, 2013, 6 pages.
Notice of Allowance issued for U.S. Appl. No. 12/556,076, dated Jul. 18, 2013, 13 pages.
Notice of Allowance issued for U.S. Appl. No. 12/556,109, dated Jul. 30, 2013, 10 pages.
Office Action (with English Translation) for Japanese Patent Application No. 2011-526297, dated Jul. 22, 2013, 19 pages.
Office Action (with English translation) for Japanese Patent Application No. 2011-526298, dated Jul. 22, 2013, 21 pages.
Office Action (with English translation) for Chinese Patent Application No. 200980141911.3, dated Jul. 26, 2013, 20 pages.
Notice of Allowance issued for U.S. Appl. No. 12/896,145, dated Jul. 26, 2013, 17 pages.
Office Action issued for Chinese Patent Application No. 200980142589.6, dated Oct. 21, 2013, 13 pages.
Office Action issued for U.S. Appl. No. 13/942,375, dated Nov. 20, 2013, 13 pages.
Office Action issued for U.S. Appl. No. 12/179,164, dated Jan. 3, 2014, 23 pages.
Notice of Allowance issued for U.S. Appl. No. 12/556,076, dated Jan. 16, 2014, 6 pages.
Notice of Allowance issued for U.S. Appl. No. 12/556,109, dated Jan. 24, 2014, 5 pages.
Office Action (with English translation) for Chinese Patent Application No. 200980141911.3, dated Feb. 21, 2014, 14 pages.
Notice of Allowance issued for Japanese Patent Application No. 2011-526297, dated Mar. 28, 2014, 3 pages.
Notice of Allowance issued for Japanese Patent Application No. 2011-526298, dated Mar. 28, 2014, 3 pages.
Office Action issued for U.S. Appl. No. 12/179,164, dated May 6, 2014, 13 pages.
Office Action issued for Chinese Patent Application No. 200980142589.6, dated May 8, 2014, 10 pages.
Office Action issued for U.S. Appl. No. 13/942,375, dated Jun. 12, 2014, 17 pages.
Office Action issued in U.S. Appl. No. 14/256,796, dated Aug. 14, 2014, 12 pages.
Office Action issued in U.S. Appl. No. 14/256,791, dated Aug. 26, 2014, 12 pages.
Office Action issued in U.S. Appl. No. 12/556,076, dated Sep. 2, 2014, 7 pages.
Office Action issued in U.S. Appl. No. 12/556,109, dated Sep. 2, 2014, 7 pages.
Office Action issued in U.S. Appl. No. 12/179,164, dated Sep. 15, 2014, 15 pages.
Office Action issued in U.S. Appl. No. 13/942,375, dated Oct. 6, 2014, 6 pages.
Notice of Allowance issued for U.S. Appl. No. 14/256,791, dated Dec. 22, 2014, 12 pages.
Office Action issued for U.S. Appl. No. 12/179,164, dated Dec. 24, 2014, 14 pages.
Notice of Allowance issued for U.S. Appl. No. 12/556,109, dated Dec. 30, 2014, 8 pages.
Notice of Allowance issued for U.S. Appl. No. 14/256,796, dated Dec. 31, 2014, 11 pages.
Notice of Allowance issued for U.S. Appl. No. 12/556,076, dated Jan. 5, 2015, 8 pages.
International Search Report and Written Opinion issued for PCT Application No. PCT/US2012/047672, dated Oct. 10, 2012, 7 pages.

(56) References Cited

OTHER PUBLICATIONS

Office Action issued for U.S. Appl. No. 13/554,743, dated Nov. 8, 2012, 18 pages.
Office Action issued for U.S. Appl. No. 13/554,743, dated May 31, 2013, 35 pages.
Notice of Allowance issued for U.S. Appl. No. 13/554,743, dated Sep. 30, 2013, 15 pages.
Debruine et al. "Capacity Costs with Time-Based and Use-Based Asset Value Attrition," Accounting Horizons, vol. 25, No. 2, 2011, pp. 337-356.
Hartman, "Automobile Replacement Case Studies for Engineering Economy Classes," The Engineering Economist, Spring 1998, vol. 43, No. 3, pp. 278-289.
Ohta et al, "Automobile Prices Revisited: Extensions of the Hedonic Hypothesis," Household Production and Consumption, National Bureau of Economic Research, 1976, vol. ISBN: 0-870-14515-0, pp. 325-398.
Prado, "The European Used-Car Market at a Glance: Hedonic Resale Price Valuation in Automotive Leasing Industry," Aug. 2009, Economics Bulletin, vol. 29 No. 3 pp. 2086-2099.
International Preliminary Report on Patentability issued for PCT Application No. PCT/US2012/047672, dated Apr. 3, 2014, 6 pages.
Office Action issued for U.S. Appl. No. 14/145,252, dated Dec. 3, 2014, 18 pages.
Office Action issued for U.S. Appl. No. 14/054,390, dated Dec. 3, 2014, 13 pages.
Extended European Search Report issued for European Patent Application No. 12817230.1, dated Dec. 15, 2014, 5 pages.
Decision of Rejection issued for Chinese Patent Application No. 200980142589.6, dated Nov. 13, 2014, 10 pages.
Office Action issued for U.S. Appl. No. 14/666,005, dated Apr. 21, 2015, 12 pgs.
Office Action issued for Canadian Patent Application No. 2,736,477, dated Nov. 28, 2016, 6 pages.
Office Action issued for Canadian Patent Application No. 2,837,338, dated Dec. 28, 2016, 4 pages.
Office Action issued for Chinese Patent Application No. 201280031793.2, dated Jan. 13, 2017, 19 pages.
Notice of Allowance issued for Japanese Patent Application No. 2014-522909, dated Feb. 16, 2017, 3 pages.
Office Action issued for U.S. Appl. No. 12/179,164, dated Feb. 28, 2017, 17 pages.
Office Action issued for U.S. Appl. No. 14/031,930, dated Oct. 3, 2016, 25 pages.
Office Action issued for U.S. Appl. No. 12/179,164, dated Oct. 6, 2016, 10 pages.
Office Action issued for U.S. Appl. No. 14/026,111, dated Oct. 19, 2016, 24 pages.
Office Action issued for U.S. Appl. No. 14/145,252, dated Oct. 20, 2016, 9 pages.
Youngs, "Three Values Associated with Used-Vehicle Pricing," J.D. Power, <<http://www.jdpower.com/cars/articles/tips-advice/three-values-associated-used-vehicle-pricing.>>, Feb. 24, 2012, 1 page.
Office Action issued for Chinese Application No. 201280035029.9, dated Sep. 29, 2016, 15 pages.
Office Action issued for U.S. Appl. No. 13/951,292, dated Nov. 22, 2016, 9 pages.
Reexamination Decision issued for Chinese Application No. 200980142589.6, dated Nov. 29, 2016, 12 pages.
Office Action issued for U.S. Appl. No. 14/068,836, dated Dec. 22, 2016, 9 pages.
Office Action issued for Canadian Patent Application No. 2,837,338, dated Feb. 1, 2016, 4 pages.
Office Action issued for Chinese Application No. 200980142589.6, dated Jul. 1, 2016, 4 pages.
Office Action issued for U.S. Appl. No. 14/068,836, dated Jul. 20, 2016, 13 pages.
Office Action issued for U.S. Appl. No. 14/666,005, dated Sep. 1, 2016, 7 pages.
Office Action issued for U.S. Appl. No. 14/026,111, dated May 26, 2017, 33 pages.
Notice of Allowance issued for Chinese Application No. 201280035026.9, dated May 25, 2017, 2 pages.
Notice of Allowance issued for U.S. Appl. No. 13/951,292, dated Jun. 12, 2017, 14 pages.
Notice of Allowance issued for U.S. Appl. No. 14/666,005, dated Jun. 14, 2017, 12 pages.
Office Action issued for U.S. Appl. No. 14/031,930, dated Jun. 15, 2017, 11 pages.
Notice of Allowance issued for U.S. Appl. No. 14/068,836, dated Jun. 26, 2017, 14 pages.
Notice of Allowability issued for U.S. Appl. No. 14/666,005, dated Jun. 29, 2017, 9 pages.
Corrected Notice of Allowability issued for U.S. Appl. No. 13/951,292, dated Jun. 29, 2017, 8 pages.
Corrected Notice of Allowability issued for U.S. Appl. No. 14/666,005, dated Jul. 6, 2017, 5 pages.
Notice of Allowance issued for U.S. Appl. No. 14/068,836, dated Jul. 24, 2017, 8 pages.
Office Action issued for Canadian Patent Application No. 2,837,338, dated Feb. 2, 2018, 5 pages.
Summons to Attend Oral Proceedings issued for European Patent Application No. 12817230.1, mailed Feb. 9, 2018, 10 pages.
Office Action issued for U.S. Appl. No. 14/026,111, dated Feb. 28, 2018, 41 pages.
Office Action issued for U.S. Appl. No. 14/145,252, dated Aug. 24, 2017, 18 pages.
Office Action issued for U.S. Appl. No. 15/396,225, dated Oct. 19, 2017, 14 pages.
Office Action issues for U.S. Appl. No. 14/031,930, dated Oct. 4, 2017, 16 pages.
Office Action issued for Canadian Application No. 2,736,477, dated Nov. 3, 2017, 4 pages.
Notice of Allowance issued for U.S. Appl. No. 15/631,318, dated Dec. 12, 2017, 16 pages.
Notice of Allowance issued for U.S. Appl. No. 14/671,731 dated Dec. 15, 2017, 17 pages.
Notice of Allowability issued for U.S. Appl. No. 14/671,731 dated Jan. 19, 2018, 7 pages.
Office Action issued for U.S. Appl. No. 14/145,252 dated Jan. 10, 2018, 12 pages.
Office Action issued for U.S. Appl. No. 14/666,005, dated Apr. 18, 2016, 10 pages.
Office Action issued for European Application No. 12817230.1, dated Mar. 16, 2016, 4 pages.
Office Action issued for U.S. Appl. No. 14/666,005, dated Sep. 11, 2015, 13 pages.
Office Action issued for U.S. Appl. No. 14/145,252, dated Oct. 6, 2015, 26 pages.
Office Action issued for Canadian Patent Application No. 2,736,477, dated Nov. 18, 2015, 6 pages.
Office Action issued for U.S. Appl. No. 12/179,164, dated Nov. 23, 2015, 21 pages.
Osler, Brian, "Rip-Off USA: The North American Car Market," Consumer Policy Review, Nov./Dec. 2002, vol. 12, No. 6, pp. 1-7.
Office Action issued for Japanese Patent Application No. 2014-522909, dated Nov. 6, 2015, 13 pages.
International Preliminary Report on Patentability issued for PCT Application No. PCT/US12/44128, dated Jan. 16, 2014, 5 pages.
Extended European Search Report issued for European Patent Application No. 15159912.3, dated May 19, 2015, 8 pages.
Office Action issued for Application No. 14/145,252, dated Jun. 26, 2015, 21 pages.
Office Action issued for European Application No. 15159912.3, dated May 18, 2016, 4 pages.
Notice of Allowance issued for Japanese Patent Application No. 2014-522939, dated May 31, 2016, 3 pages.
Office Action issued for U.S. Appl. No. 14/145,252, dated Jun. 15, 2016, 10 pages.
Office Action issued for U.S. Appl. No. 13/951,292, dated Jun. 20, 2016, 17 pages.

(56) References Cited

OTHER PUBLICATIONS

Office Action issued for U.S. Appl. No. 14/145,252, dated Apr. 19, 2017, 11 pages.
Office Action issued for U.S. Appl. No. 15/396,225, dated Apr. 19, 2017, 13 pages.
International Search Report and Written Opinion issued for PCT Application No. PCT/US12/44128, dated Sep. 12, 2012, 6 pages.
Office Action issued for U.S. Appl. No. 15/864,855, dated May 29, 2018, 13 pages.
Office Action issued for U.S. Appl. No. 14/031,930, dated Jun. 14, 2018, 16 pages.
Notice of Allowance issued for U.S. Appl. No. 15/864,855, dated Oct. 2, 2018, 6 pages.
Office Action issued for U.S. Appl. No. 14/031,930, dated Oct. 17, 2018, 12 pages.
Office Action issued for Canadian Patent Application No. 2,736,477, dated Oct. 31, 2018, 5 pages.
Notice of Allowance issued for U.S. Appl. No. 15/674,317, dated Jan. 17, 2019, 11 pages.
Notice of Allowance issued for U.S. Appl. No. 15/391,541, dated Jan. 23, 2019, 11 pages.
Notice of Allowance issued for U.S. Appl. No. 15/393,505, dated Jan. 28, 2019, 15 pages.
Office Action issued for Canadian Patent Application No. 2,837,338, dated Feb. 28, 2019, 5 pages.

\* cited by examiner

SYSTEM, METHOD AND COMPUTER PROGRAM PRODUCT FOR GEO-SPECIFIC VEHICLE PRICING

TECHNICAL FIELD

This disclosure relates generally to pricing vehicles in a marketplace. More particularly, embodiments disclosed herein relate to a system, method, and computer program product for geo-specific vehicle pricing.

BACKGROUND OF THE RELATED ART

When purchasing a vehicle, consumers are often faced with the problem in finding and/or understanding what the true value for a vehicle might be. Today's vehicle marketplace offers a multitude of methods for pricing vehicles. Unfortunately, these methods often report inconsistent or even conflicting prices for vehicles. Furthermore, conventional methods for vehicle pricing are generally based on administrative boundaries, such as countries, U.S. Census regions, and states. Consumers searching for a vehicle in geographic areas smaller than U.S. Census regions may face additional challenges as pricing data in such areas tend to be sparse, resulting in vehicle prices for the same model and trim varying greatly from area to area.

Complicating the matter is the fact that consumers often do not have sufficient, relevant, and/or accurate information on a particular vehicle or do not understand such information, including interdependence between local demand and availability of the vehicle. To illustrate with a specific example, a recommended price (e.g., $20,000) for a particular vehicle model and trim may not take into account how sensitive that price is (e.g., "Is $19,000 a good or bad price for this vehicle model and trim in a beach town on an island?") or how the vehicle model compares to another vehicle model with a similar trim at about the same price. Consequently, there is always room for improvement.

SUMMARY OF THE DISCLOSURE

Embodiments disclosed herein provide a system, method, and computer program product for a geo-specific model for estimation of vehicle prices. In some embodiments, geographic regions may be classified into regions smaller than U.S. Census regions. For example, geographic regions may include ZIP-Code tabulation areas, sub-Designated Market Areas, Designated Market Areas, Designated Market Groups and Designated Market Regions. In some embodiments, vehicle transactions are also taken into account. The transaction data may be aggregated from various data sets. In some embodiments, geographic regions and vehicle transaction data may then be applied to a statistical model to obtain a vehicle price.

In some embodiments, a method for pricing a vehicle in a geographic region may comprise, by a computing device, applying a regression model to a first set of variables, a second set of variables, and a third set of variables. The first set of variables may represent vehicle-specific attributes, the second set of variables may represent industry data and vehicle supply and demand, and the third set of variables may represent local-level customer and demographic factors that influence car-buying behavior in the geographic region. Examples of the third set of variables may include geo-specific socioeconomic variables. A predicted margin ratio may be generated for the vehicle based on results from the regression model and applied to a cost of the vehicle to generate a geo-specific price estimation for the vehicle in the geographic region. In some embodiments, the results from the regression model may be adjusted based on a number of observations, which may be generated utilizing temporally-weighted historical data, to account for geographic biases. The geographic region may represent or be smaller than a designated market area, or it may represent a ZIP Code or some other geographical boundary.

Software implementing embodiments disclosed herein may be implemented in suitable computer-executable instructions that may reside on one or more non-transitory computer-readable storage media. Within this disclosure, the term "computer-readable medium" encompasses all types of data storage media that can be read by at least one processor. Examples of a computer-readable medium can include random access memories, read-only memories, hard drives, data cartridges, magnetic tapes, floppy diskettes, flash memory drives, optical data storage devices, compact-disc read-only memories, and other appropriate computer memories and data storage devices.

Embodiments disclosed herein can provide many advantages. For example, in some embodiments, the geo-specific model may provide for a vehicle estimation that is both geographic and data driven. In some embodiments, vehicle transaction data may be collected at the ZIP-Code level. This may provide for fine data resolution in addition to transaction data at a larger region. This may present a clear picture of vehicle pricing based on geographic regions.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

The disclosure and various features and advantageous details thereof are explained more fully with reference to the exemplary, and therefore non-limiting, embodiments illustrated in the accompanying drawings and detailed in the following description. Descriptions of known programming techniques, computer software, hardware, operating platforms and protocols may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like.

Figure 1:
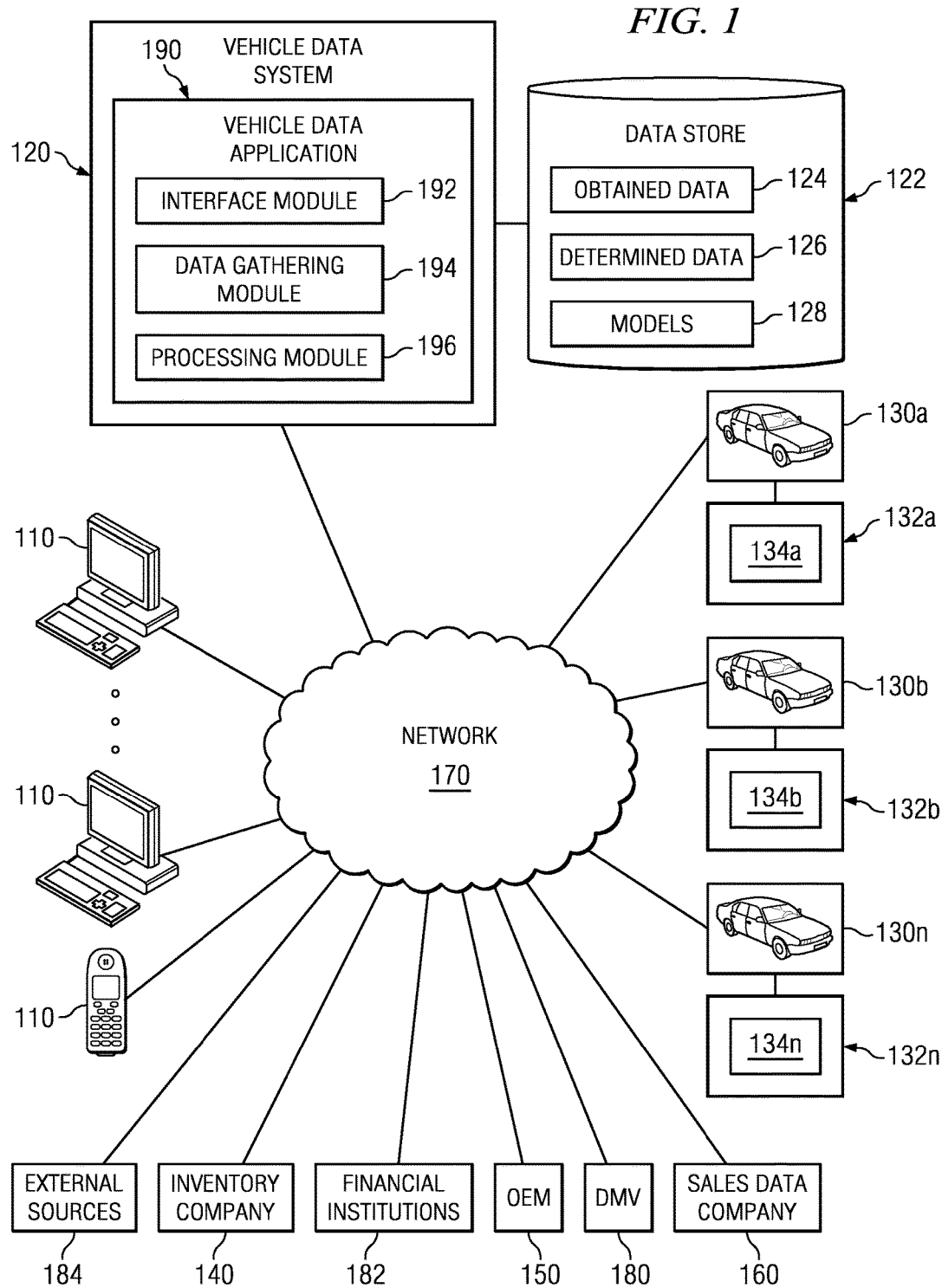
FIG. 1 depicts one embodiment of a topology including a vehicle data system.

FIG. 1 depicts one embodiment of a topology which may be used to implement embodiments of the systems and methods disclosed herein. The topology comprises a set of entities including vehicle data system 120 (also referred to herein as the TrueCar system) which is coupled through network 170 to computing devices 110 (e.g., computer systems, personal data assistants, kiosks, dedicated terminals, mobile telephones, smart phones, etc.), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments disclosed herein. These applications may include a vehicle data application 190 comprising one or more applications (instructions embodied on one or more non-transitory computer readable media) configured to implement an interface module 192, data gathering module 194 and processing module 196 utilized by the vehicle data system 120. Furthermore, vehicle data system 120 may include data store 122 operable to store obtained data 124, data 126 determined during operation, models 128 which may comprise a set of dealer cost model or price ratio models, or any other type of data associated with embodiments disclosed herein or determined during the implementation of those embodiments.

Vehicle data system 120 may provide a wide degree of functionality including utilizing one or more interfaces 192 configured to for example, receive and respond to queries from users at computing devices 110; interface with inventory companies 140, manufacturers 150, sales data companies 160, financial institutions 182, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration or incentive data the user wishes to apply, if any. The vehicle data system 120 can select a particular set of data in the data store 122 based on the user specified parameters, process the set of data using processing module 196 and models 128, generate interfaces using interface module 192 using the selected data set and data determined from the processing, and present these interfaces to the user at the user's computing device 110. More specifically, in one embodiment interfaces 192 may visually present the selected data set to the user in a highly intuitive and useful manner.

In particular, in one embodiment, a visual interface may present at least a portion of the selected data set as a price curve, bar chart, histogram, etc. that reflects quantifiable prices or price ranges (e.g., "average," "good," "great," "overpriced," etc.) relative to reference pricing data points (e.g., invoice price, MSRP, dealer cost, market average, internet average, etc.). Using these types of visual presentations may enable a user to better understand the pricing data related to a specific vehicle configuration. Additionally, by presenting data corresponding to different vehicle configurations in a substantially identical manner, a user can easily make comparisons between pricing data associated with different vehicle configurations. To further aid the user's understanding of the presented data, the interface may also present data related to incentives which were utilized to determine the presented data or how such incentives were applied to determine presented data.

Turning to the various other entities in the topology, dealer 130 may be a retail outlet for vehicles manufactured by one or more of OEMs 150. To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS 132) that enables data to be retrieved from the DMS 132. Many dealers 130 may also have one or more web sites which may be accessed over network 170, where pricing data pertinent to the dealer 130 may be presented on those web sites, including any pre-determined, or upfront, pricing. This price is typically the "no haggle" price (i.e., price with no negotiation) and may be deemed a "fair" price by vehicle data system 120.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, AutoTrader.com, FordVehicles.com, etc.).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in the topology of FIG. 1 are necessary, or even desired, in embodiments disclosed herein, and that certain of the functionality described with respect to the entities depicted in the topology may be combined into a single entity or eliminated altogether. Additionally, in some embodiments other data sources not shown in the topology may be utilized. The topology is therefore exemplary only and should in no way be taken as imposing any limitations on embodiments disclosed herein.

Figure 2:
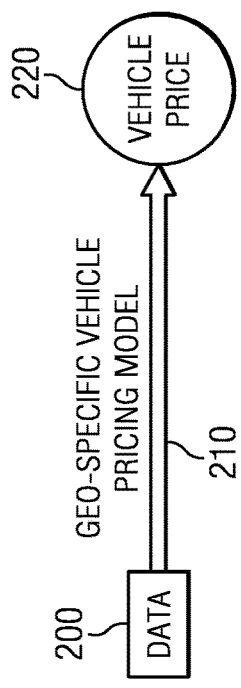
FIG. 2 depicts one embodiment of a model that transforms data into vehicle prices.

FIG. 2 depicts one embodiment of a model 210 that transforms data 200 into vehicle prices 220. In this example, model 210 may aggregate data 200 from numerous sources and may transform data 200 into geo-specific vehicle prices 220 on the TrueCar system.

Figure 3:
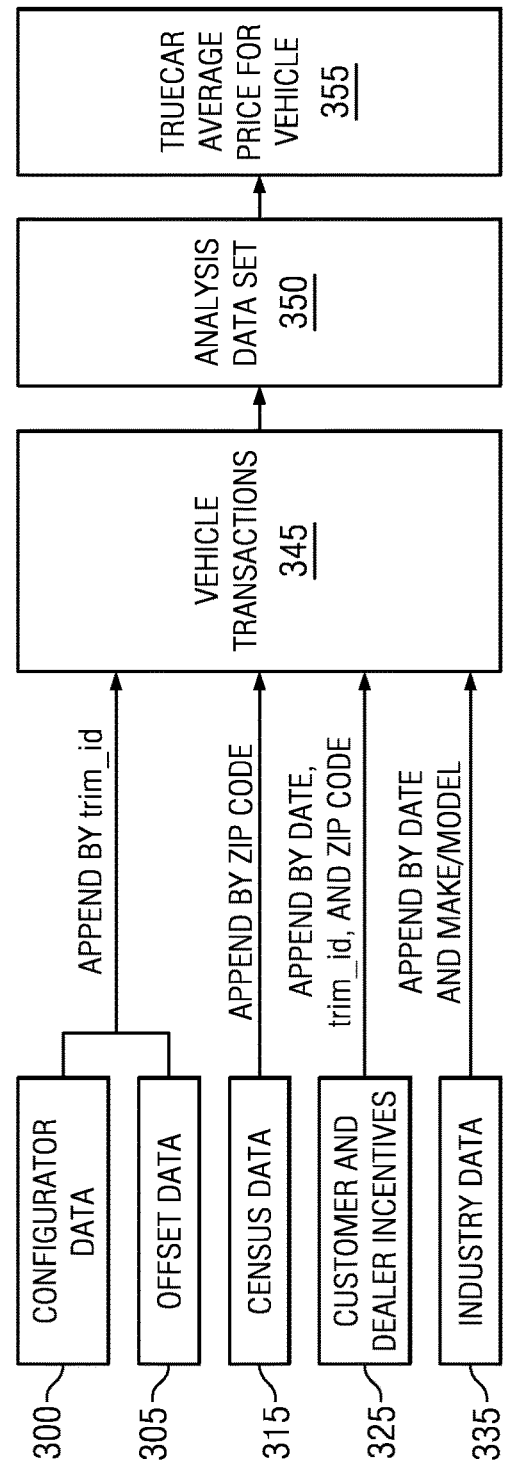
FIG. 3 depicts one embodiment of a model that uses data to obtain a vehicle price.

FIG. 3 depicts one embodiment of data used to obtain vehicle price. In this example, various types of data may be supplied by and/or obtained from various sources for calculation of geo-specific vehicle prices. In one embodiment, a plurality of types of data collected may include transaction data, configurator data 300, offset data 305, census data 315, customer and dealer incentives 325, and industry data 335. In one embodiment, transaction data may contain details for new vehicle transactions including sales date, year, make, model, vehicle trim, transaction MSRP, transaction invoice, reported price, reported cost, days to turn, and customer and dealer ZIP Code.

In one embodiment, configurator data 300 may contain general features of vehicles by trim. Example features may include body type, base MSRP, base invoice, engine displacement and number of cylinders, fuel type, and number of doors.

In one embodiment, offset data 315 may include prices of vehicles offered by dealerships reported as an offset from MSRP. These may be referred to as dealer offsets.

In one embodiment, customer and dealer incentives data 325 may include dealer and customer cash incentives by date, location, and vehicle trim. In one embodiment, if an incentive is presently active for the vehicle trim and location specified by the user, the price may be adjusted accordingly.

In one embodiment, industry data 335 may include auto industry data by make and model. Example auto industry data may include sales, incentives dollars spent, inventory, and days supply of vehicle.

The various types of data collected at a TrueCar system can be appended to vehicle transactions in various ways. For example, as shown in FIG. 3, configurator data 300 and offset data 305 may be appended using trim_id; census data 315 may be appended using zip code; customer and dealer incentives data 325 may be appended using date, trim_id, and zip code; and industry data 335 may be appended using date and make/model. Vehicle transactions 345 may be used in data analysis 350 to produce a TrueCar average price for a vehicle 355.

Vehicle transaction activity varies widely across the United States and may be a function of population, consumer-based vehicle demand, and the density of dealers. In a geographic area of fixed size, such as ten square miles, one may find a large number of vehicle transactions in densely-populated urban regions and little or no transactions in sparsely populated rural areas. Additionally, the demand for certain vehicle characteristics may also vary widely. This may include market shares for vehicles produced in foreign countries tend to be smaller in what is known as the Rust Belt in the U.S.

In non-geo specific embodiments, vehicle price estimates could be made according to standard administrative and political boundaries. Examples of administrative and political boundaries may include U.S. states and U.S. Census regions. In embodiments disclosed herein, vehicle price estimates could be made at the Designated Market Areas (DMAs) level and, where possible, over smaller geographic areas. More specifically, embodiments disclosed herein utilize geographic demarcation points that can be more heavily based on the factors that influence car-buying behavior. DMAs, which are non-overlapping consumer-based geographic clusters, coupled with the postal ZIP Codes at which a TrueCar demand is measured, may allow construction of a simple, hierarchical geographical structure that covers every square inch of US land mass. In some embodiments, the hierarchical geographical structure may be described in the following steps:

(1) DMA to ZIP Code:

A mapping of ZIP Codes to DMAs was acquired from the Nielson Media Research, the institution which built the DMAs. As of 2010, the mapping did not include every one of the known 42,333 ZIP Codes and therefore did not fully cover the land mass of the United States on which vehicle consumers may reside. To remedy this situation, in one embodiment, unmatched ZIP Codes are assigned to the DMAs. The assignment may be done by comparing the unmatched ZIP Code to all matched ZIP Codes with the same leading three digits. For example, to map ZIP Code 90401 to a DMA, it was compared with all ZIP Codes beginning with "904" and assigned to the same DMA as the ZIP Code with the 3-digit match and where the distance between the geographic centers of the matched ZIP Code and unmatched ZIP Code was the smallest.

(2) ZIP Code to ZIP Code Tabulation Area (ZCTA):

In one embodiment, the smallest geographic unit for which data may be collected may be the postal ZIP Code. While every potential or actual vehicle buyer who has an address in the U.S. also has a distinct ZIP Code, the ZIP Codes do not necessarily have explicit geographic boundaries since they are based on postal routes and not distinct polygons. The U.S. Census Bureau created ZIP Code Tabulation Areas (ZCTAs) that partition the U.S. into a set of polygons that are non-overlapping and contain the entire land mass of the US. In one embodiment, all ZIP Codes are mapped into their appropriate ZCTAs based on a determination of whether the geographic center of each ZIP Code lies within the ZCTA polygon. In one embodiment, by determining if the centroid of a ZIP code was within the ZCTA polygon, it can be feasible to assign every ZIP Code to a ZCTA and, more importantly, to be able to use the explicit spatial relationships to determine if any two ZCTAs share a boundary.

(3) DMA to subDMA:

In one embodiment, DMAs can be divided into non-overlapping polygons to create smaller regions whose construction favors consumer buying behavior over administrative boundaries. To divide DMAs into smaller areas—the resulting areas may be called "subDMAs"—the following steps are taken:

Step 1: Any ZCTA for which there were at least a number of vehicle transactions (say, 20) in a data set for a defined time period (say, a 16-week period ending on Jul. 31, 2010) can become a subDMA of the DMA to which it belongs.

Step 2: If there are not identifiable subDMAs based on the vehicle transaction rule, the DMA may not be divided and so may contain only one subDMA which is identical to the DMA.

Step 3: For every pair of ZCTAs, i and j, whose geographic centers are within a distance (say, 100 miles) of each other, a 6-dimensional spatial-socioeconomic difference may be computed in the following equation:

$$d_{i,j} = [GCD_{i,j}^2 + \Sigma_{p=1}^{5} |x_{i,p} - x_{j,p}|^2]^{1/2}$$

where $GCD_{i,j}$ can be the Great Circle Distance between the centroids of ZCTAs i and j and each of the p=1, . . . , 5 indexes may represent a rescaled (over [0,1]) feature of the ZCTA. All features that have been transformed to a numeric format can then be represented on scale bounded over [0,1] as follows:

$$x_{i,p} = \frac{\left(x_{i,p} - \min_{i} x_{\cdot,p}\right)}{\left(\max_{i} x_{\cdot,p} - \min_{i} x_{\cdot,p}\right)}$$

In one example embodiment, p may represent the following features in the following table:

| p | Feature |
| --- | --- |
| 1 | Labor force participation rate in the ZCTA based on the 2000 Census relative to national median |
| 2 | Percentage of households in a ZCTA living in a block categorized as "urban" during the 2000 Census relative to the national percentage |
| 3 | Average household income in the ZCTA based on the 2000 Census relative to the national income |
| 4 | Median asking price of homes in the ZCTA based on the 2000 Census relative to the national median asking price |
| 5 | Mean value of homes in the ZCTA relative to the national value |

Figure 4:
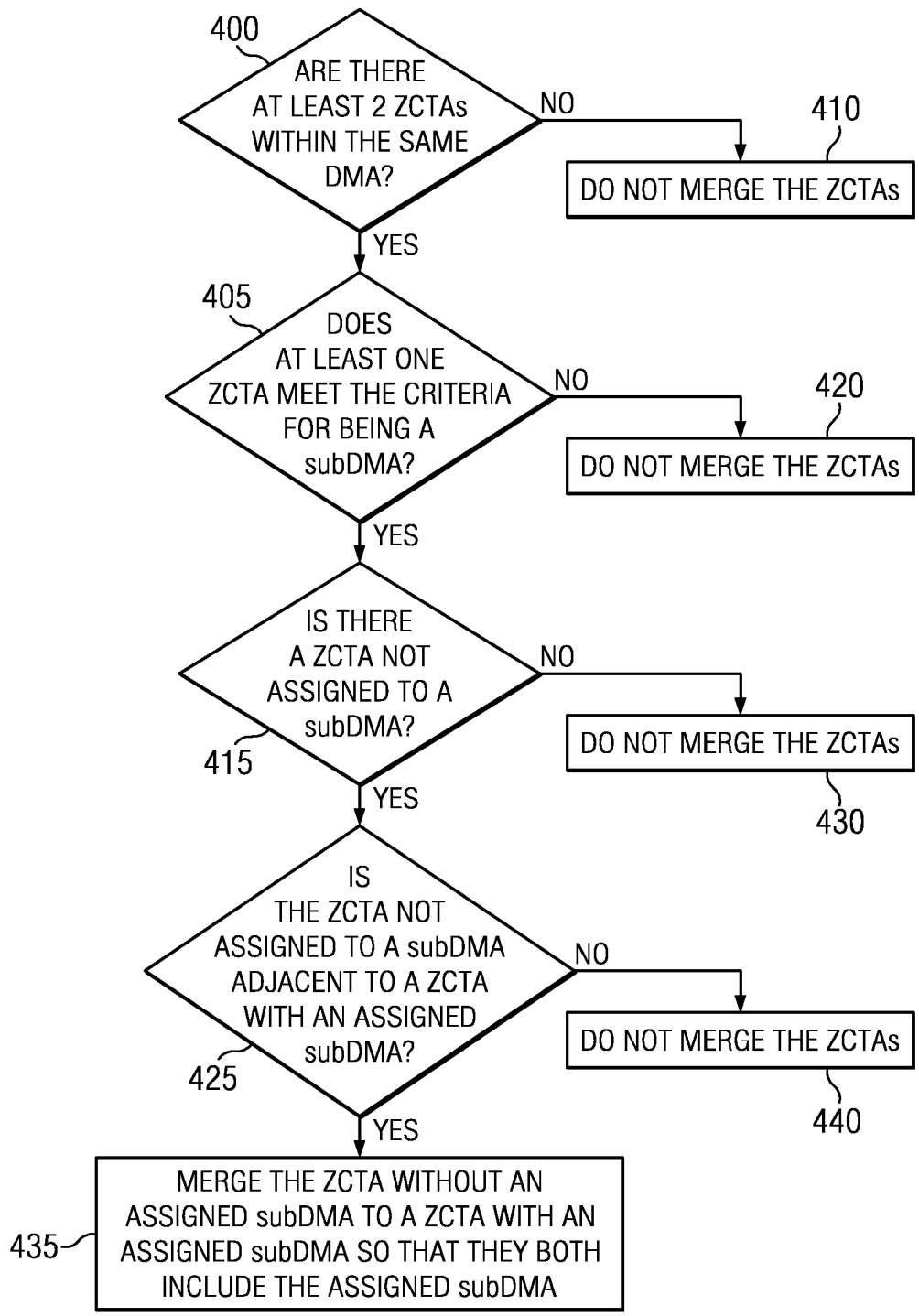
FIG. 4 depicts a flow diagram illustrating one example embodiment of a method for determining merging between geographical units.

Step 4: For any ZCTA not designated as a subDMA based on vehicle transactions, that ZCTA can be merged with the subDMA for which it is both adjacent in a spatial sense and has the smallest value of $d_{i,j}$ among its adjacencies. This can be a recursive process as explained in FIG. 4.

At step 400, a determination may be made whether there are at least two ZCTAs within the same DMA. If there are at least two ZCTAs within the same DMA, then at step 405, a determination may be made if at least one ZCTA meet the criteria for being a subDMA. If there are not at least two ZCTAs within the same DMA, then at step 410, there may not be merging of DMAs. If there is at least one ZCTA that meets the criteria for being a subDMA, then at step 415 a determination may be made if there is a ZCTA not assigned to a subDMA. If there is not at least one ZCTA that meets the criteria for being a subDMA then at step 420 there may not be merging of ZCTAs. If there is a ZCTA not assigned to a subDMA, then at step 425 a determination may be made if the ZCTA not assigned to a subDMA is adjacent to a ZCTA with an assigned subDMA. If there is not a ZCTA not assigned to a subDMA, then at step 430 there may not be merging of ZCTAs. If there is a ZCTA not assigned to a subDMA that is adjacent to a ZCTA with an assigned subDMA, then there can be a merging of the ZCTA without an assigned subDMA to the ZCTA with an assigned subDMA so that they both include the assigned subDMA at step 435. If there is not a ZCTA not assigned to a subDMA that is adjacent to a ZCTA with an assigned subDMA, then at step 440 there may not be a merging of ZCTAs. This method of merging ZCTAs in FIG. 4 may be understood by an example shown in FIG. 5.

Figure 5:
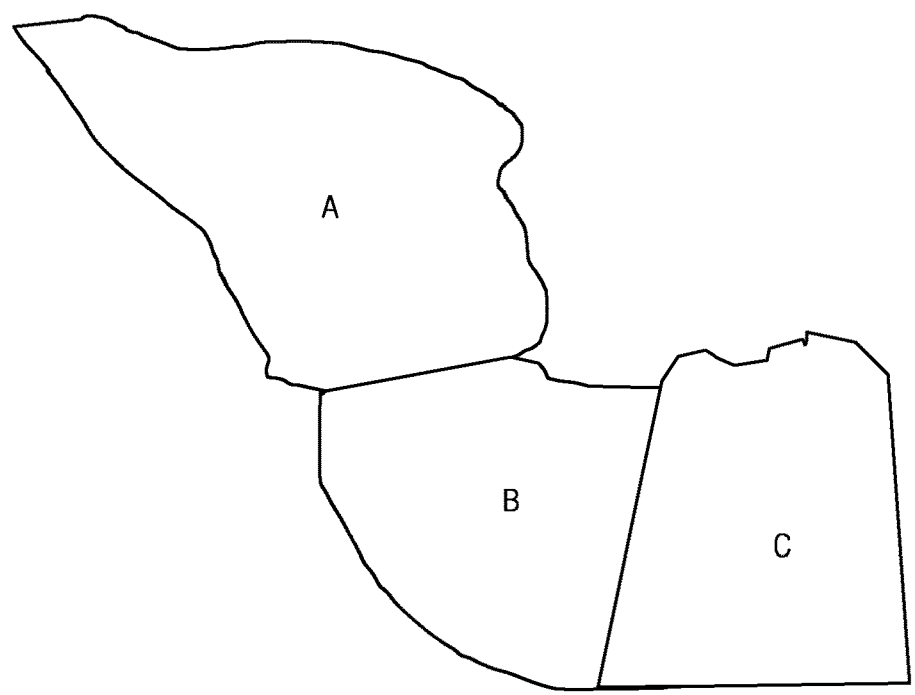
FIG. 5 depicts one embodiment of adjacent geographical units.

FIG. 5 depicts three ZCTAs as ZCTA "A", ZCTA "B" and ZCTA "C". Applying the method in FIG. 4 to the ZCTA regions in FIG. 5, "A", "B", and "C" may be ZCTAs in the same DMA as in step 400. Next, a determination can be made that "A" is a valid ZCTA and meets the criteria for being a subDMA as in step 405. Moving onto step 415, a determination may be made that "B" and "C" are ZCTAs not yet assigned to a subDMA. In making the determination at step 425, "B" may be seen as adjacent to both "A" and "C." "C" is not adjacent to "A". In this example, at first "B" may join "A" to so that the subDMA includes both "A" and "B" as in step 435. Once "B" merges with "A", "C" can then join the subDMA since it is adjacent to one of the ZCTAs in the subDMA as in step 435.

Figure 6:
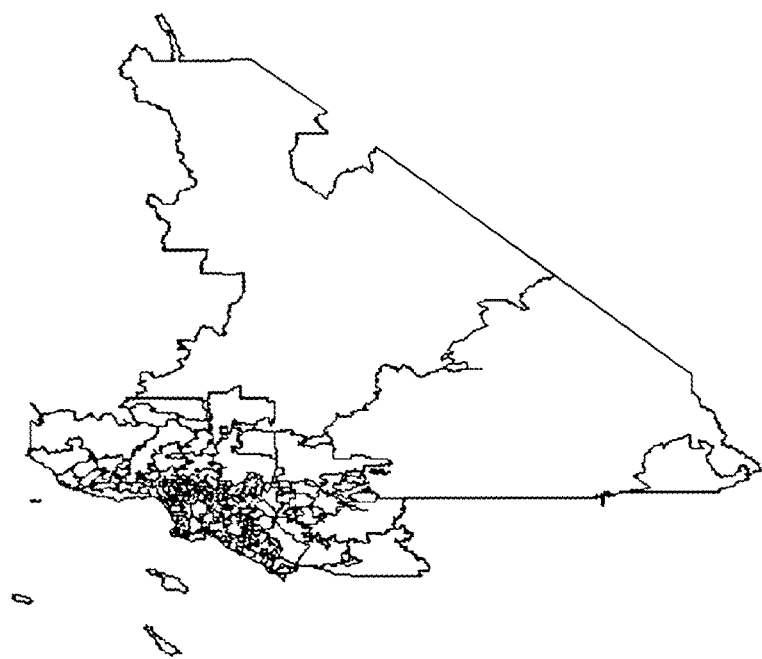
FIG. 6 depicts a one embodiment of example geographical units for Los Angeles, Calif.

In one embodiment, there may be a total of 1941 subDMAs and 191 DMAs located. FIG. 6 provides an example of how the Los Angeles, Calif. DMA can be divided into 153 subDMAs using the steps specified above in FIG. 4.

(4) DMA to DMAGroup:

Using a similar approach to merging polygons as used in the clustering of ZCTAs into subDMAs, DMAGroups may be built by merging adjacent DMAs based on spatial adjacency and similarity of socioeconomic characteristics. One example distinction: DMAGroups may contain DMAs that are up to 250 miles from one another. The DMAGroup may act as a geographic entity similar to a US state, though they may be more uniformly sized and reflect vehicle-buying behavior rather than administrative boundaries. In one embodiment, after applying these rules, there may be 131 DMAGroups with some containing a single DMA.

(5) DMAGroup-DMARegion:

Using a similar approach to merging polygons as used in the clustering of DMAs into DMAGroups, DMARegions may be built by merging adjacent DMAGroups based on spatial adjacency and similarity of socioeconomic characteristics with one exception: DMARegions may contain DMAGroups that are up to 500 miles from one another. The DMARegion may act as a geographic entity similar to a US Census region, though they may be more uniformly sized and reflect vehicle-buying behavior rather than administrative boundaries. In one embodiment, after applying these rules, there may be 12 DMARegion: Alaska, Hawaii, and 10 others that cover the land mass of the Continental US.

Figure 7:
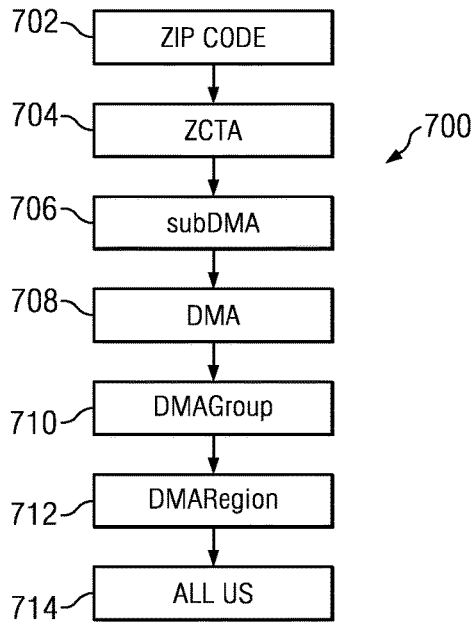
FIG. 7 depicts one embodiment of a consumer-based hierarchy.

As an example, the consumer-based hierarchy described above may be in the order as shown in FIG. 7. In this example, hierarchy 700 utilizes ZIP Code 702 as the smallest region. ZCTA 704, subDMA 706, DMA 708, DMAGroup 710, DMARegion 712, and All US 714 are positioned upstream from ZIP Code 702. This hierarchy may also be seen as: ZIP Code→ZCTA→subDMA→DMA→DMAGroup→DMARegion→All US Every vehicle legally registered in the United States has a unique Vehicle Identification Number (VIN) that contains, among other information, the following vehicle features:
Year
Make
Model
Body Type.

The combination of these vehicle features may be referred to as YMMB and may be denoted by the subscript q. Furthermore, the index for a distinct vehicle may be denoted by the index i, and if that vehicle has the YMMB combination denoted by q, it may be stated as i$\epsilon$q. Furthermore, for the vehicle make denoted by m, there may be an indication that an individual vehicle belongs to that make by stating that i$\epsilon$m.

In one embodiment, to provide geo-specific price estimates, one could simply summarize all transactions for a specific vehicle in a particular geographic area. Two complications exist with this approach. First, the transactions data available to compute summary statistics may represent only about 40% of all vehicle transactions and so it may be regarded as a sample rather than the population of transactions. Second, for every possible combination of year, make, model, trim and option, the number of transactions available for each combination may be too small to draw inferences about vehicle prices.

In order to provide high-quality pricing estimates for a wide array of vehicles and areas, a flexible definition of "geo-specific" may be both geographic and data driven. At its finest resolution, vehicle transaction data may be collected at the ZIP Code level. At increasingly coarse levels of resolution, the spatial hierarchy detailed earlier can be: ZIP Code→ZCTA→subDMA→DMA→DMAGroup→DMARegion→All US.

Figure 8:
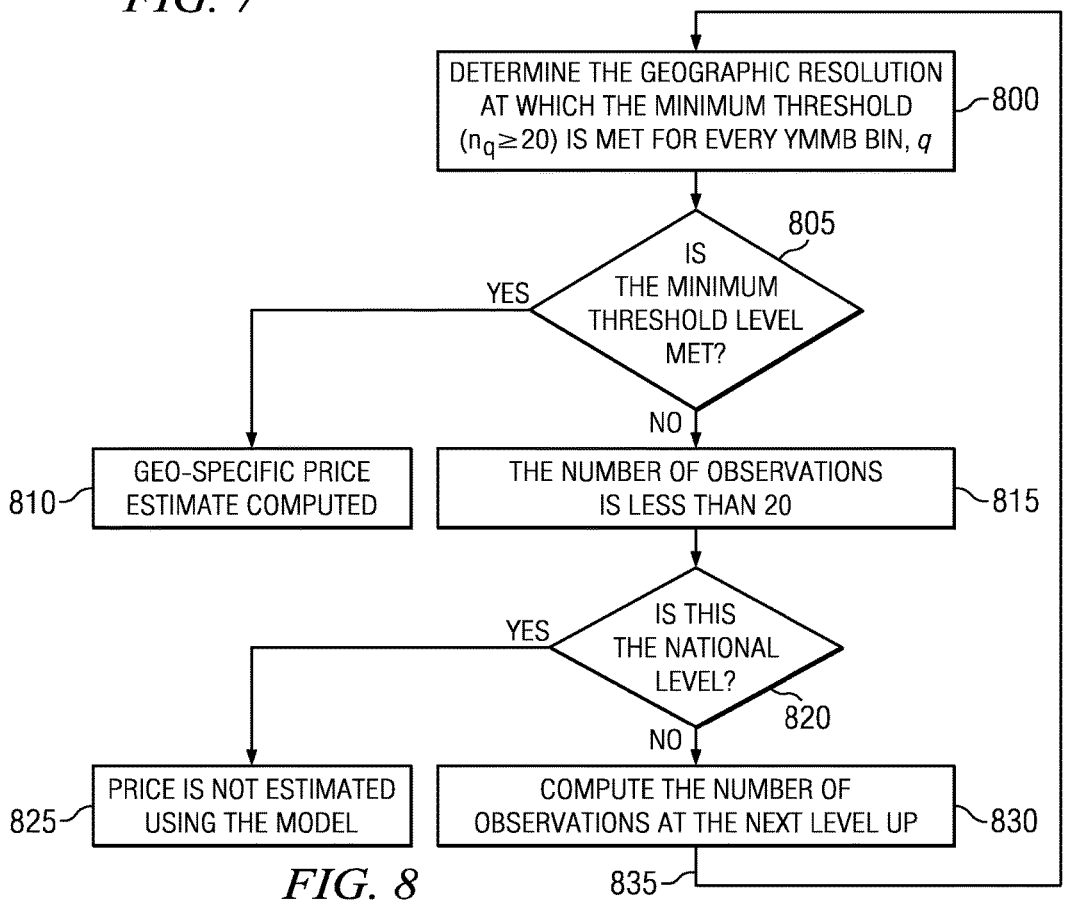
FIG. 8 depicts a flow diagram illustrating one example embodiment of a method for determining a geo-specific price estimate.

An estimation of pricing at the highest level of resolution may be possible provided that a quality standard is met. FIG. 8 provides an example of price estimation. In one embodiment, since the standard error of the estimated price may be inversely proportional to the sample size, $std.err_q = \sigma_q / \sqrt{n_q}$, where $n_q$ may be the number of observations in bin q.

At step 800, there may be a determination of the geographic resolution at which the minimum threshold, $n_q \geq 20$, may be met for every YMMB bin, q. At step 805, for bin q, if the minimum threshold is met at the ZIP Code level, then the geo-specific price estimate may be computed for the ZIP Code at step 810. If the number of observations is less than 20 at step 815, then at step 820 a determination may be made if number of observations is less than 20 at the national level. If the number of observations is less than 20 at the national level, then the price is not estimated using this model at step 825. If the number of observations less than 20 is not at the national level, then the number of observations at the next level up is computed at step 830. This hierarchical evaluation continues until the minimum threshold $n_q$ is met. If the threshold is not met at the highest level, the national level, then the price is not estimated using this model.

Geo-Specific Price Modeling

After classifying transactions data into bins of vehicles having similar characteristics (e.g., the YMMB bins), a statistical pricing model for the vehicle pricing using the following operations may be utilized:

(a) Use of temporally-weighted historical data to generate a sufficient number of observations needed to draw inferences with acceptable confidence at the geo-specific level.
(b) Use of geo-specific socioeconomic variables to account for geographic differences in consumer behavior. Example geo-specific socioeconomic variables may include median income and median home prices.
(c) Accounting for the effect of supply and demand of a vehicle price. For example, sales velocity and days supply of vehicles.
(d) Vehicle-specific attributes. Examples of vehicle-specific attributes may include engine type and drive type.
(e) Application of a mixed-effects regression model that is spatially smoothed to reflect observed geographic biases.

1. Temporal Weighting of Historical Observations

Figure 9:
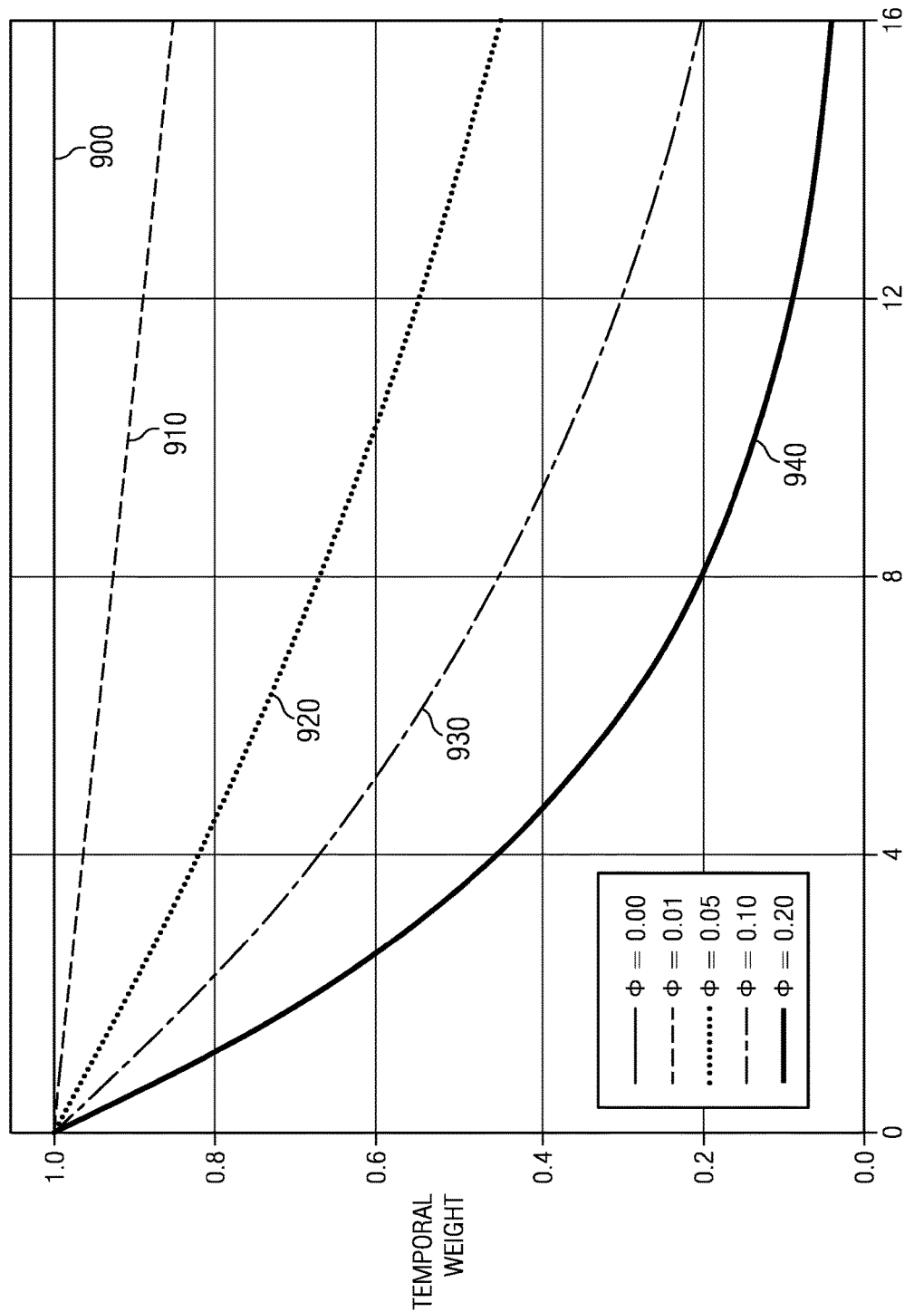
FIG. 9 depicts a diagram illustrating one embodiment of temporal weight functions for degradation factors.

Every historical transaction, $y_i$, can be used in the geo-specific modeling process. However, use of a transaction that occurred in the very distant past may cause misleading results, particularly if the new-car market has witnessed recent changes such as the presence of incentives, seasonal fluctuations, or programs like the 2010 "Cash-for-Clunkers" program. In one embodiment, to put emphasis on more recent transactions and thereby more quickly capture change, a temporal weight can be assigned to each observation based on its age: $w_i = e^{-\phi A_i}$ where $A_i$ may be the age, in weeks, of observation $y_i$ at the time when the pricing model is executed. FIG. 9 shows an example of weights with various degradation factors, $\phi$. For any YMMB bin q, the number of observations weighted in a geo-specific region is $$n_q = \sum_{i \in q} w_i$$

and can be used to determine if a threshold (in this example, $n_q \geq 20$) is met for any bin/geo-specific combination.

It can be important to choose the appropriate value of degradation factor $\phi$ and also the minimum observation age for which historical observations are not used. FIG. 9 depicts a graph where line 900 represents the temporal weight function for factor $\phi$ set at 0.00; line 910 represents the temporal weight function for factor $\phi$ set at 0.01; line 920 represents the temporal weight function for factor $\phi$ set at 0.05; line 930 represents the temporal weight function for factor $\phi$ set at 0.10; and line 940 represents the temporal weight function for factor $\phi$ set at 0.20. As an example, various combinations of $\phi=\{0,.1,.2,.3,.4.5,.6,.7)$ and a week cutoff of 4, 8, 12, and 16 weeks were considered in an analysis of historical performance. Use of more than 4 weeks of data underperformed other combinations as a result of the persistence of dealer and customer incentive that had ended weeks earlier yet remained in the analysis. In this example, based on the analysis of historical performance, a value of $\phi=0.5$ may be used and any observation older than 4 weeks at the time of analysis may not be used.

2. Geo-Specific Socioeconomic Data

Because consumer demand may vary with geography based on the characteristics and taste of the local population, a set of variables z that includes geo-specific information obtained from our data providers and the US Census Bureau (based on their 2000 decennial census) may be used. This may include: 1) fraction of rural households in the locality compared to national percentage, 2) median home price in the locality compared to the national median home price, 3) percentage of work force participation in locality compared to national work force participation and, 4) the number of vehicle dealerships for a specific make in the locality.

3. Inventory Data

As imbalance between consumer demand and dealer supply may affect prices, calendar and inventory in the geo-specific model may be accounted for and include a set of variables y that includes: 1) number of days the vehicle spent in lot before sale, 2) number of sales of a YMMB in the past four weeks (sales velocity), 3) a flag indicating that an individual transaction occurs at end of month, 4) industry-wide incentives offered for a particular make, model compared to overall incentives spent, and 5) days supply of a particular make and model.

4. Vehicle-Specific Data

To account for structural and pricing differences in each vehicle, a set of variables x may be considered that include: 1) the natural logarithm of the MSRP of the base vehicle without options, 2) natural logarithm of the ratio of MSRP of the vehicle with options and the base vehicle, 3) the ratio of available customer cash for the vehicle in the sales region to the reported cost, 4) the ratio of available dealer cash for the vehicle in the sales region to the reported cost, 5) relative to cost, the difference between dealer cash available at the time of the transaction and the four-week average of the dealer cash, 5) relative to cost, the difference between customer cash available at the time of the transaction and the four-week average of the customer cash, 6) the vehicle body type such as SUV, Van or Truck), and 7) the number of cylinders in the vehicle's engine.

5. Mixed Effects Regression Model

A mixed effects regression model may be built for the margin ratio (mr) defined as $$mr = \frac{\text{price}}{\text{cost}}$$

relative to its four-week mean value in the same bin q. The cost value may be based on a product of the transaction MSRP and a cost adjustment factor:

$$\text{cost}_i = \text{transaction}_{MSRP_i} \times \text{cost adjustment factor}_q,$$

and the cost adjustment factor may be computed across all vehicles in the bin, q, and reflects the average ratio of vehicle cost relative to the transaction_MSRP, both inclusive of options.

The model can be summarized by a simple equation:

$$\frac{\text{price}_i}{\text{cost}_i} - \left(\overline{\frac{\text{price}_i}{\text{cost}_i}}\right)_q = mr_i - \overline{mr_q}$$

$$= \alpha_o + \alpha_m + \sum_j \beta_j x_i + \sum_k \delta_m y_i + \sum_l \lambda_l z_i + \varepsilon_i$$

$$\overline{mr_q} = \frac{\sum_{i \in q} w_i mr_i}{\sum_{i \in q} w_i}$$

In the preceding equation, the features in set x may represent a set of variables which impact the margin ratio such as vehicle attributes, the set y may represent industry data and vehicle supply and demand, and the set z may represent local-level customer and demographic information as well as industry-level data, $\alpha_0$ can be a global intercept term, $\alpha_m$ can be a make-level intercept applied only when i∈m and $\overline{mr_q}$ can denote a 4-week weighted average of the margin ratios for the particular YMMB bin q. The choice of the width of temporal window may vary over time if it is determined that a different window improves price prediction accuracy. To adjust for known geographic biases the error term, $\varepsilon_i$ can be decomposed into two parts:

$$\varepsilon_i = \rho \sum_{j \neq i} K(g_{i,j}) \varepsilon_j + e_i$$

where $g_{i,j}$ may be the Great Circle Distance between an observation i and all observations j (computed based on the distance between the geocenters of their subDMAs), K may be a kernel such that $$K(g_{i,j}) = \frac{1}{\sqrt{g_{i,j}}}$$

if the observations are in different subDMAs and 0 otherwise, $\varepsilon_j$ may be the error term from all other observations, and $-1 \leq \rho \leq 1$ may be the degree to which residuals are spatially correlated, and $e_i$ may be the residual that exists after the estimated spatial autocorrelation has been removed.

The geo-specific price estimation model $$\frac{price_i}{cost_i} - \left(\overline{\frac{price_i}{cost_i}}\right) = mr_i - \overline{mr_q}$$
$$= \alpha_o + \alpha_m + \sum_j \beta_j x_i + \sum_k \delta_m y_i +$$
$$\sum_l \lambda_l z_i + \rho \sum_{j \neq i} K(g_{i,j}) \varepsilon_j + e_i$$

can then be estimated using weighed Ordinary Least Squares (OLS) to find the estimated parameters $\hat{\alpha}, \hat{\beta}, \hat{\delta}, \hat{\lambda}$ and $\rho$ that result in the smallest sum of temporally weighted squared residuals: $\Sigma_i w_i e_i^2$. Given the results of the regression equation, the predicted margin ratio a vehicle in bin q can then be $\widetilde{mr_i} = \widehat{mr_i} + \overline{mr_q}$, where $\widehat{mr_i}$ may be the predicated margin ratio that results from the model. The final estimated price for the vehicle in transaction i may then be $\widehat{price_i} = \widetilde{mr_i} \times cost_i$.

To estimate the price for any vehicle in bin q within the local area, the following may be used to display price (on a website) for the base vehicle (i.e., without options) as:

$$\widehat{price_q} = \widetilde{mr_q} \times cost_q.$$

Although this disclosure has been described with respect to specific embodiments, these embodiments are merely illustrative, and not restrictive of the invention disclosed herein. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for pricing a vehicle in a geographic region, the method comprising:

obtaining, from a plurality of sources by a vehicle data system having a processor and a non-transitory computer readable medium, historical vehicle transaction data at varying levels of geographic resolution including at least a Zip Code level, the vehicle data system communicatively connected to the plurality of sources, user devices, and point of sale locations over a network;

storing, by the vehicle data system, the historical vehicle transaction data with vehicle features obtained from the plurality of sources in a data store, the vehicle features including year, make, model, and body (YMMB);

selecting, from the data store by the vehicle data system, a data set containing the historical vehicle transaction data and combinations of YMMB;

classifying, by the vehicle data system, the historical vehicle transaction data into a plurality of bins according to corresponding combinations of YMMB such that each of the plurality of bins includes one or more transactions for vehicles having the same combination of YMMB, and wherein all of the vehicle transaction data in the data set is classified into the plurality of bins;

subsequent to classifying the historical vehicle transaction data into the plurality of bins, determining, by the vehicle data system, a geographic resolution at which a number of transactions in every bin of the plurality of bins meets or exceeds a minimum threshold, the determining comprising determining the number of transactions in each of the plurality of bins beginning at the Zip Code level and relative to a geographic hierarchy having levels of geographic resolution which includes, in order of increasing coarseness, at least the Zip Code level, a Zip Code to Zip Code Tabulation Area (ZCTA) level, and a sub-Designated Market Areas (DMA) level, until the number of transactions in every bin of the plurality of bins meets or exceeds the minimum threshold, the geographic resolution thus determined by the vehicle data system representing a least coarse geographic resolution for the data set selected by the vehicle data system from the data store, the least coarse geographic resolution corresponding to a geographic region;

applying, by the vehicle data system, a geo-specific vehicle pricing model at the highest possible geographic resolution for the data set, wherein application of the geo-specific vehicle pricing model comprises:
  determining a degradation factor value and a maximum transaction age over which transactions in the historical vehicle transaction data are not used in the geo-specific vehicle pricing model, the determining comprising analyzing historical performance of the historical vehicle transaction data using combinations of degradation factor values and transaction ages, choosing the combination of degradation factor value and transaction age which have the greatest relative performance, and weighting each transaction in the data set based on corresponding transaction age and the degradation factor value;
  determining geo-specific socioeconomic data for a set of geo-specific socioeconomic variables to account for geographic differences in consumer behavior, the geo-specific socioeconomic data specific to the geographic region and including a number of point of sale locations for a specific combination of YMMB in the geographic region, and adjusting pricing for the geographic region based on the geo-specific socioeconomic data;
  determining inventory data for a set of supply and demand variables, the inventory data including a number of days a vehicle of the specific combination of YMMB spent in a corresponding point of sale location before the vehicle is sold and a number of historical sales of vehicles having the specific combination of YMMB based on the transactions in the historical vehicle transaction data that meet or exceed the minimum transaction age and that thus are used in the geo-specific vehicle pricing model;
  determining vehicle-specific features for a set of vehicle-specific variables, the vehicle-specific features including a vehicle body type; and
  determining a predicted margin ratio representing a ratio of price over cost particular to a bin of the plurality of bins that corresponds to the specific combination of YMMB, the predicted margin ratio determined by the vehicle data system utilizing a regression model in which the set of geo-specific socioeconomic variables, the set of supply and demand variables, and the set of vehicle-specific variables are provided as weighted inputs so as to account for effects of the geo-specific socioeconomic data, the inventory data, and the vehicle-specific features on the predicted margin ratio;
generating, by the vehicle data system, a geo-specific price estimate for a vehicle of interest in the specific combination of YMMB within the geographic region, the generating utilizing the predicted margin ratio for the bin of the plurality of bins that corresponds to the specific combination of YMMB and a cost of the vehicle of interest; and
providing, by the vehicle data system, the geo-specific price estimate for the vehicle of interest to a website on the Internet for display on a client computing device over the network.

2. A method according to claim 1, further comprising:
adjusting the geo-specific price estimate to account for an incentive that is presently active for the vehicle of interest within the geographic region.

3. A method according to claim 1, further comprising:
assigning a temporal weight to each transaction of the transactions in the historical vehicle transaction data based on age.

4. A method according to claim 1, wherein the least coarse geographic resolution for the data set comprises a DMA region, a DMA group, a DMA, a subDMA, a ZCTA, or a Zip Code.

5. A method according to claim 1, wherein the geo-specific socioeconomic data further comprises a median home price in the geographic region as compared to a national median home price.

6. A vehicle data system for pricing a vehicle in a geographic region, the system comprising:
  at least one processor communicatively connected to a network; and
  at least one non-transitory computer readable storage medium storing instructions translatable by the at least one processor to perform the steps of:
    obtaining, from a plurality of sources, historical vehicle transaction data at varying levels of geographic resolution including a Zip Code level, the vehicle data system communicatively connected to the plurality of sources, user devices, and point of sale locations over a network;
    storing the historical vehicle transaction data with vehicle features obtained from the plurality of sources in a data store, the vehicle features including year, make, model, and body (YMMB);
    selecting, from the data store, a data set containing the historical vehicle transaction data and combinations of YMMB;
    classifying the historical vehicle transaction data into a plurality of bins according to corresponding combinations of YMMB such that each of the plurality of bins includes one or more transactions for vehicles having the same combination of YMMB, and wherein all of the vehicle transaction data in the data set is classified into the plurality of bins;
    subsequent to classifying the historical vehicle transaction data into the plurality of bins, determining a geographic resolution at which a number of transactions in every bin of the plurality of bins meets or exceeds a minimum threshold, the determining comprising determining the number of transactions in each of the plurality of bins beginning at the Zip Code level and relative to a geographic hierarchy having levels of geographic resolution which includes, in order of increasing coarseness, at least the Zip Code level, a Zip Code to Zip Code Tabulation Area (ZCTA) level, and a sub-Designated Market Areas (DMA) level, until the number of transactions in every bin of the plurality of bins meets or exceeds the minimum threshold, the geographic resolution thus determined by the vehicle data system representing a least coarse geographic resolution for the data set selected by the vehicle data system from the data store, the highest possible geographic resolution corresponding to a geographic region;
    applying a geo-specific vehicle pricing model at the highest possible geographic resolution for the data set, wherein application of the geo-specific vehicle pricing model comprises:
      determining a degradation factor value and a maximum transaction age over which transactions in the historical vehicle transaction data are not used in the geo-specific vehicle pricing model, the determining comprising analyzing historical performance of the historical vehicle transaction data using combinations of degradation factor values and transaction ages, choosing the combination of degradation factor value and transaction age which have the greatest relative performance, and weighting each transaction in the data set based on corresponding transaction age and the degradation factor value;

determining geo-specific socioeconomic data for a set of geo-specific socioeconomic variables to account for geographic differences in consumer behavior, the geo-specific socioeconomic data specific to the geographic region and including a number of point of sale locations for a specific combination of YMMB in the geographic region, and adjusting pricing for the geographic region based on the geo-specific socioeconomic data;

determining inventory data for a set of supply and demand variables, the inventory data including a number of days a vehicle of the specific combination of YMMB spent in a corresponding point of sale location before the vehicle is sold and a number of historical sales of vehicles having the specific combination of YMMB based on the transactions in the historical vehicle transaction data that meet or exceed the minimum transaction age and that thus are used in the geo-specific vehicle pricing model;

determining vehicle-specific features for a set of vehicle-specific variables, the vehicle-specific features including a vehicle body type; and determining a predicted margin ratio representing a ratio of price over cost particular to a bin of the plurality of bins that corresponds to the specific combination of YMMB, the predicted margin ratio determined by the vehicle data system utilizing a regression model in which the set of geo-specific socioeconomic variables, the set of supply and demand variables, and the set of vehicle-specific variables are provided as weighted inputs so as to account for effects of the geo-specific socioeconomic data, the inventory data, and the vehicle-specific features on the predicted margin ratio;

generating a geo-specific price estimate for a vehicle of interest within the locality and in the specific combination of YMMB within the geographic region, the generating utilizing the predicted margin ratio for the bin of the plurality of bins that corresponds to the specific combination of YMMB and a cost of the vehicle of interest; and providing the geo-specific price estimate for the vehicle of interest to a website on the Internet for display on a client computing device over the network.

7. A system according to claim 6, wherein the instructions are further translatable by the at least one processor to perform:

adjusting the geo-specific price estimate to account for an incentive that is presently active for the vehicle of interest within the geographic region.

8. A system according to claim 6, wherein the instructions are further translatable by the at least one processor to perform:

assigning a temporal weight to each transaction of the transactions in the historical vehicle transaction data based on age.

9. A system according to claim 6, wherein the least coarse geographic resolution for the data set comprises a DMA region, a DMA group, a DMA, a subDMA, a ZCTA, or a Zip Code.

10. A system according to claim 6, wherein the geo-specific socioeconomic data further comprises a median home price in the geographic region as compared to a national median home price.

11. A computer program product for pricing a vehicle in a geographic region, the computer program product comprising at least one non-transitory computer readable medium storing instructions translatable by at least one processor of a vehicle data system to perform the steps of:

obtaining, from a plurality of sources, historical vehicle transaction data at varying levels of spatial resolution including a Zip Code level, the vehicle data system communicatively connected to the plurality of sources, user devices, and point of sale locations over a network;

storing the historical vehicle transaction data with vehicle features obtained from the plurality of sources in a data store, the vehicle features including year, make, model, and body (YMMB);

selecting, from the data store, a data set containing the historical vehicle transaction data and combinations of YMMB;

classifying the historical vehicle transaction data into a plurality of bins according to corresponding combinations of YMMB such that each of the plurality of bins includes one or more transactions for vehicles having the same combination of YMMB, and wherein all of the vehicle transaction data in the data set is classified into the plurality of bins;

subsequent to classifying the historical vehicle transaction data into the plurality of bins, determining a geographic resolution at which a number of transactions in every bin of the plurality of bins meets or exceeds a minimum threshold, the determining comprising determining the number of transactions in each of the plurality of bins beginning at the Zip Code level and relative to a geographic hierarchy having increasingly coarse levels of geographic resolution which includes, in order of increasing coarseness, at least the Zip Code level, a Zip Code to Zip Code Tabulation Area (ZCTA) level, and a sub-Designated Market Areas (DMA) level, until the number of transactions in every bin of the plurality of bins meets or exceeds the minimum threshold, the geographic resolution thus determined by the vehicle data system representing a least coarse geographic resolution for the data set selected by the vehicle data system from the data store, the least coarse geographic resolution corresponding to a geographic region;

applying a geo-specific price vehicle pricing model at the highest possible geographic resolution for the data set, wherein application of the geo-specific vehicle pricing model comprises:

determining a degradation factor value and a maximum transaction age over which transactions in the historical vehicle transaction data are not used in the geo-specific vehicle pricing model, the determining comprising analyzing historical performance of the historical vehicle transaction data using combinations of degradation factor values and transaction ages, choosing the combination of degradation factor value and transaction age which have the greatest relative performance, and weighting each transaction in the data set based on corresponding transaction age and the degradation factor value;

determining geo-specific socioeconomic data for a set of geo-specific socioeconomic variables to account for geographic differences in consumer behavior, the geo-specific socioeconomic data specific to the geographic region and including a number of point of sale locations for a specific combination of YMMB in the geographic region, and adjusting pricing for the geographic region based on the geo-specific socioeconomic data;

determining inventory data for a set of supply and demand variables, the inventory data including a number of days a vehicle of the specific combination of YMMB spent in a corresponding point of sale location before the vehicle is sold and a number of historical sales of vehicles having the specific combination of YMMB based on the transactions in the historical vehicle transaction data that meet or exceed the minimum transaction age and that thus are used in the geo-specific vehicle pricing model;

determining vehicle-specific features for a set of vehicle-specific variables, the vehicle-specific features including a vehicle body type; and determining a predicted margin ratio representing a ratio of price over cost particular to a bin of the plurality of bins that corresponds to the specific combination of YMMB, the predicted margin ratio determined by the vehicle data system utilizing a regression model in which the set of geo-specific socioeconomic variables, the set of supply and demand variables, and the set of vehicle-specific variables are provided as weighted inputs so as to account for effects of the geo-specific socioeconomic data, the inventory data, and the vehicle-specific features on the predicted margin ratio;

generating a geo-specific price estimate for a vehicle of interest within the geographic region and in the bin of the plurality of bins that corresponds to the specific combination of YMMB, the generating utilizing the predicted margin ratio for the bin of the plurality of bins that corresponds to the specific combination of YMMB and a cost of the vehicle of interest; and providing the geo-specific price estimate for the vehicle interest to a website on the Internet for display on a client computing device over the network.

12. A computer program product according to claim 11, wherein the instructions are further translatable by the at least one processor to perform:
adjusting the geo-specific price estimate to account for an incentive that is presently active for the vehicle of interest within the geographic region.

13. A computer program product according to claim 11, wherein the instructions are further translatable by the at least one processor to perform:
assigning a temporal weight to each transaction of the transactions in the historical vehicle transaction data based on age.

14. A computer program product according to claim 11, wherein the least coarse geographic resolution for the data set comprises a DMA region, a DMA group, a DMA, a subDMA, a ZCTA, or a Zip Code.

15. A method according to claim 1, further comprising:
terminating application of the geo-specific vehicle pricing model if the number of transactions in one or more bins of the plurality of bins does not meet or exceed the minimum threshold.

16. A system according to claim 6, wherein the instructions are further translatable by the at least one processor to perform:
terminating application of the geo-specific vehicle pricing model if the number of transactions in one or more bins of the plurality of bins does not meet or exceed the minimum threshold.

17. A computer program product according to claim 11, wherein the instructions are further translatable by the at least one processor to perform:
terminating application of the geo-specific vehicle pricing model if the number of transactions in one or more bins of the plurality of bins does not meet or exceed the minimum threshold.

18. A computer program product according to claim 11, wherein the geo-specific socioeconomic data further comprises a median home price in the geographic region as compared to a national median home price.

* * * * *